US011228517B2

(12) United States Patent
Beyah et al.

(10) Patent No.: US 11,228,517 B2
(45) Date of Patent: Jan. 18, 2022

(54) DEVICE FINGERPRINTING FOR CYBER-PHYSICAL SYSTEMS

(71) Applicant: Georgia Tech Research Corporation, Atlanta, GA (US)

(72) Inventors: Abul Raheem Beyah, Atlanta, GA (US); David Formby, Atlanta, GA (US); Preethi Srinivasan, Atlanta, GA (US)

(73) Assignee: GEORGIA TECH RESEARCH CORPORATION, Atlanta, GA (US)

( * ) Notice: Subject to any disclaimer, the term of this patent is extended or adjusted under 35 U.S.C. 154(b) by 151 days.

(21) Appl. No.: 16/583,988

(22) Filed: Sep. 26, 2019

(65) Prior Publication Data
US 2020/0106686 A1    Apr. 2, 2020

Related U.S. Application Data

(63) Continuation of application No. 15/556,136, filed as application No. PCT/US2016/020985 on Mar. 4, 2016, now abandoned.

(60) Provisional application No. 62/202,262, filed on Aug. 7, 2015, provisional application No. 62/129,382, filed on Mar. 6, 2015.

(51) Int. Cl.
*G06F 15/16*    (2006.01)
*H04L 12/26*    (2006.01)
*H04L 29/06*    (2006.01)

(52) U.S. Cl.
CPC .......... *H04L 43/0876* (2013.01); *G06F 15/16* (2013.01); *H04L 43/065* (2013.01); *H04L 63/1408* (2013.01); *H04L 63/0876* (2013.01)

(58) Field of Classification Search
CPC ... G06F 15/16; H04L 43/065; H04L 43/0876; H04L 63/0876; H04L 63/1408
See application file for complete search history.

(56) References Cited

U.S. PATENT DOCUMENTS

| | | | |
|---|---|---|---|
| 7,929,508 B1 | 4/2011 | Yucek et al. | |
| 9,225,732 B2 | 12/2015 | Beyah et al. | |
| 2002/0159396 A1 | 10/2002 | Carlson et al. | |
| 2003/0079084 A1* | 4/2003 | Gotoh | G06F 3/0689 711/117 |
| 2003/0193268 A1* | 10/2003 | Junhua | B41J 2/14233 310/328 |
| 2004/0247169 A1* | 12/2004 | Ross | G07D 7/206 382/137 |
| 2006/0155387 A1 | 7/2006 | Pieronek | |
| 2008/0059636 A1 | 3/2008 | Freimuth et al. | |
| 2008/0215322 A1* | 9/2008 | Fischer | G10L 15/065 704/243 |
| 2012/0019395 A1 | 1/2012 | Willig et al. | |

(Continued)

OTHER PUBLICATIONS

European Search Report dated Feb. 14, 2019 (Application No. 16762239.8).

(Continued)

*Primary Examiner* — Chris Parry
*Assistant Examiner* — Dixon F Dabipi
(74) *Attorney, Agent, or Firm* — Thomas Horstemeyer, LLP

(57) ABSTRACT

Disclosed are various embodiments for identifying devices that are part of a network. Devices are modeled based on physical characteristics. Devices are classified or device communications can be verified.

20 Claims, 13 Drawing Sheets

(56) References Cited

U.S. PATENT DOCUMENTS

| | | | |
|---|---|---|---|
| 2012/0198047 A1 | 8/2012 | Steuer et al. | |
| 2013/0139263 A1 | 5/2013 | Beyah et al. | |
| 2013/0242795 A1 | 9/2013 | Heen et al. | |
| 2013/0318616 A1* | 11/2013 | Christodorescu | H04L 63/1408 726/25 |
| 2014/0173220 A1 | 6/2014 | Condict | |
| 2015/0026374 A1 | 1/2015 | Decesaris et al. | |
| 2015/0378339 A1* | 12/2015 | Ji | H04L 63/1408 700/73 |
| 2017/0041205 A1 | 2/2017 | Rangel et al. | |

OTHER PUBLICATIONS

Cardenas, A. A., et al., "Attacks Against Process Control Systems: Risk Assessment, Detection, and Response". ASIACCS'11 Proceeding (Mar. 2011) pp. 355-366; DOI: 10.1145/1966913.1966959.

Radhakrishnan, S.V., et al., "GTID: A Technique for Physical Device and Device Type Fingerprinting" IEEE Transactions on Dependable and Secure Computing, vol. 12, No. 5 (Nov. 2014) pp. 519-532; DOI: 10.1109/TDSC.2014.2369033.

International Search Report for PCT/US2016/020985 dated Jul. 15, 2016.

* cited by examiner

DEVICE FINGERPRINTING FOR CYBER-PHYSICAL SYSTEMS

CROSS REFERENCE TO RELATED APPLICATIONS

This application claims priority to, and the benefit of all of the following as a continuation of co-pending U.S. application entitled "DEVICE FINGERPRINTING FOR CYBER-PHYSICAL SYSTEMS" having Ser. No. 15/556, 136, filed Sep. 6, 2017, which is the 35 U.S.C. § 371 national stage application of PCT Application No. PCT/US2016/020985, filed Mar. 4, 2016, provisional application entitled "SYSTEMS AND METHODS FOR SCADA AND ICS FINGERPRINTING" having Ser. No. 62/202,262, filed Aug. 7, 2015, and provisional application entitled "A METHOD FOR SCADA AND ICS DEVICE FINGERPRINTING" having Ser. No. 62/129,382, filed Mar. 6, 2015, all of which are hereby incorporated by reference in their entireties.

STATEMENT REGARDING FEDERALLY SPONSORED RESEARCH OR DEVELOPMENT

This invention was made with government support under agreements 2106CBK awarded by the National Science Foundation. The Government has certain rights in the invention.

BACKGROUND

Fingerprinting devices on a target network, whether it is based on software or hardware, can provide network administrators with mechanisms for intrusion detection or enable adversaries to conduct surveillance in preparation for a more sophisticated attack. In the context of industrial control systems (ICS), where a cyber-based compromise can lead to physical harm to both man and machine, these mechanisms become even more important. An attacker intruding on a network can theoretically inject false data or commands and drive the system into an unsafe state. Example consequences of such an intrusion can range from widespread blackouts in a power grid to environmental disasters caused by tampering with systems carrying water, sewage oil, or natural gas. These false data and command injections could be thwarted using strong cryptographic protocols that provide integrity and authentication guarantees. However, in ICS networks it is often infeasible to upgrade legacy equipment due to their lack of processing power, the devices being in remote locations, and the critical nature of the systems that must be online at all times. Moreover, some vendors do not even support the functionality of upgrading devices to install critical patches. Since adding cryptography to resource-limited devices and keeping them patched is often infeasible and sometimes just impossible, alternative methods such as fingerprinting can be used to provide security and intrusion detection.

BRIEF DESCRIPTION OF THE DRAWINGS

Many aspects of the present disclosure can be better understood with reference to the following drawings. The components in the drawings are not necessarily to scale, with emphasis instead being upon clearly illustrating the principles of disclosure. Moreover, in the drawings, like reference numerals designate corresponding parts throughout the several views.

SUMMARY

Figure 1:
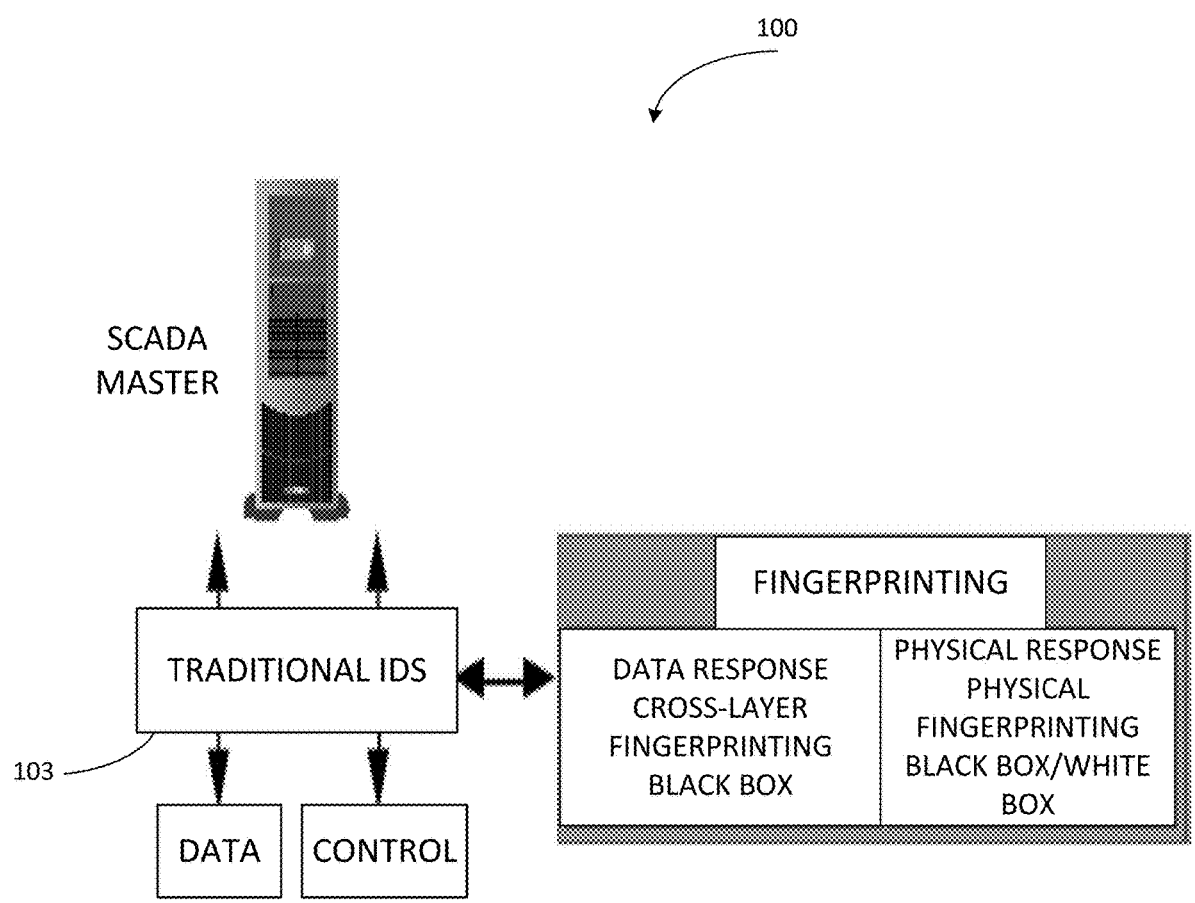
FIG. 1 is a schematic representation illustrating an example of a configuration for fingerprinting performed in a control system environment according to various embodiments of the present disclosure.

Embodiments of the present disclosure provide for device fingerprinting in cyber-physical system, such as a control system environment. Embodiments of the present disclosure can be used in conjunction with traditional intrusion detection system (IDS) in a control systems environment. Embodiments of the present disclosure can be used to achieve device fingerprinting from software, hardware, and physics-based perspectives. Embodiments of the present disclosure can prevent security compromises by accurately fingerprinting devices in a control system environment, and other networked environments, as may be appreciated. Embodiments of the present disclosure can generate fingerprints of a device which reflects identifiable characteristics of a device, such as, e.g., processing speed, processing load, memory speed, and protocol stack implementation.

In an embodiment, a network monitoring device can constantly monitor all traffic on a network. The network monitoring device can be installed in a communication path. In some embodiments, the network monitoring device can listen to a port that mirrors all traffic on the network. In some embodiments, the network monitoring device can be a tap.

A master device can send read requests for measurements over the network to field devices operating in a control systems environment. The field devices can send responses in return. The network monitoring device can parse fields in the network traffic at a transmission control protocol (TCP) level and a control system application layer. The network monitoring device can parse application layer headers. The network monitoring device can store identifying information for each of the read requests. The network monitoring device can record times when a TCP acknowledgment (ACK) is seen for each of the read requests. The network monitoring device can store a time when each response appears for every read request. The network monitoring device can measure an amount of time between the TCP ACK and the time when each response appears for every read request, referred to as a cross-layer response time (CLRT). A fingerprint for each field device can be generated based at least in part upon the amount of time between the TCP ACK of each of the read requests and the appearance of each corresponding response. In some embodiments, the fingerprint can be represented as a probability density function (PDF) of the measured amounts of time between the TCP ACK and the time when each response appears for every read request. In some embodiments, a minimum threshold number of response times can be calculated before a fingerprint can be generated.

In an embodiment, a network monitoring device can constantly monitor all traffic on a network. The network monitoring device can be installed in a communication path or can listen to a port that mirrors all traffic on the network. In some embodiments, the network monitoring device can be a tap. In some embodiments the network monitoring device can be a sniffer used to parse packets to perform deep packet inspection. A master device can send a command to a field device to perform a task or an operation. In some embodiments, a slave device can be hardwired to the field device. In other embodiments, a slave device can be connected to the field device via a digital network (e.g., Ethernet). Responses to the command from the field device can be observed at the slave device. The slave device can asynchronously respond to the master device with a message indicating an event change. In some embodiments, the event change can be observed with a network tap to calculate an operation time of the field device in responding to the command. In some embodiments, an unsolicited response timestamp can be calculated at the tap point by measuring the difference between a time at which the command was observed and a time at which the response was observed to get a measurement of physical device response time. In some embodiments, the physical field device operation times can be calculated by and stored in the slave device and later transmitted to the master. In other embodiments, a sequence of event recorder response time can be calculated by measuring the difference between a time at which was the command was observed at the tap point and an event timestamp performed by an application layer. In some embodiments, a fingerprint can be generated based at least in part upon the unsolicited response time. In other embodiments, a fingerprint can be generated based at least in part upon the sequence of event recorder response time. In some embodiments, a minimum threshold number of response times can be calculated before a fingerprint can be generated.

While embodiments of the present disclosure are described in connection with the Example and the corresponding text and figures, there is no intent to limit the disclosure to the embodiments in these descriptions. On the contrary, the intent is to cover all alternatives, modifications, and equivalents included within the spirit and scope of embodiments of the present disclosure.

DISCUSSION

This disclosure is not limited to particular embodiments described, and as such may, of course, vary. The terminology used herein serves the purpose of describing particular embodiments only, and is not intended to be limiting, since the scope of the present disclosure will be limited only by the appended claims.

Where a range of values is provided, each intervening value, to the tenth of the unit of the lower limit unless the context clearly dictates otherwise, between the upper and lower limit of that range and any other stated or intervening value in that stated range, is encompassed within the disclosure. The upper and lower limits of these smaller ranges may independently be included in the smaller ranges and are also encompassed within the disclosure, subject to any specifically excluded limit in the stated range. Where the stated range includes one or both of the limits, ranges excluding either or both of those included limits are also included in the disclosure.

The following examples are put forth so as to provide those of ordinary skill in the art with a complete disclosure and description of how to perform the methods and use the structures disclosed and claimed herein. Efforts have been made to ensure accuracy with respect to numbers (e.g., amounts, temperature, etc.), but some errors and deviations should be accounted for. Unless indicated otherwise, parts are parts by weight, temperature is in ° C., and pressure is at or near atmospheric. Standard temperature and pressure are defined as 20° C. and 1 atmosphere.

Before the embodiments of the present disclosure are described in detail, it is to be understood that, unless otherwise indicated, the present disclosure is not limited to particular materials, reagents, reaction materials, manufacturing processes, dimensions, frequency ranges, applications, or the like, as such can vary. It is also to be understood that the terminology used herein is for purposes of describing particular embodiments only, and is not intended to be limiting. It is also possible in the present disclosure that steps can be executed in different sequence, where this is logically possible. It is also possible that the embodiments of the present disclosure can be applied to additional embodiments involving measurements beyond the examples described herein, which are not intended to be limiting. It is furthermore possible that the embodiments of the present disclosure can be combined or integrated with other measurement techniques beyond the examples described herein, which are not intended to be limiting.

It should be noted that, as used in the specification and the appended claims, the singular forms "a," "an," and "the" include plural referents unless the context clearly dictates otherwise. Thus, for example, reference to "a support" includes a plurality of supports. In this specification and in the claims that follow, reference will be made to a number of terms that shall be defined to have the following meanings unless a contrary intention is apparent.

DETAILED DISCUSSION

The fingerprint (or signature) of a device can be represented as a probability density function (PDF) of the response times of devices in a cyber-physical system. To generate these PDFs, one of three modeling approaches can be used: white box, black box, or gray box modeling. In a white box approach, a dynamic model of the device is constructed from principles and model parameters identified from CAD drawings, source code, physical measurements, etc. without ever seeing any true samples from the system. The simulated behavior is then used to create a PDF by varying model parameters using an uncertainty distribution. In a black box approach, the PDF is constructed strictly from experimental data without any dynamic modeling. Black box modeling requires a significant amount of experimental measurements, but little knowledge of the underlying system. Finally, in a gray box approach, a dynamic model is first constructed and the resulting PDF is then refined based on experimental measurements. White box modeling is best suited for when a system's internal details are accessible, but access to experimental measurements is restricted. Black box modeling performs best when experimental measurements are easily available, and is especially effective when the system is proprietary or too complex to model. Finally, gray box modeling approaches are most advantageous when the basic characteristics of a software or hardware design are known, but there is some uncertainty in model structure or parameters that can only be dealt with through experimental observations.

Due to the abundance of measurements in the available dataset and lack of proprietary source code, the data acquisition fingerprinting method called cross-layer fingerprinting, focuses on a black box modeling approach. In the case of the physical fingerprinting technique, there are some devices where the operations occur so rarely that collecting enough real samples to generate an accurate fingerprint through black box modeling can be completely infeasible. Additionally, there is such a wide variety of physical devices available and their costs are so prohibitive that creating a black box signature database offline is also infeasible. Therefore an alternative approach for signature generation can be used. According to various embodiments of the present disclosure, a new class of fingerprint generation for physical fingerprinting based on white box modeling allows an administrator to generate a usable device fingerprint without ever having access to the target device type or network. The white box-generated physical fingerprint is then validated against the black box approach using an example control device. Thus, the approaches described herein take advantage of the unique characteristics of ICS devices and other control systems devices. Additionally, a new class of fingerprint generation specific to ICS networks using "white box" modeling is shown. The various embodiments of the present disclosure also show performance analysis using both real world data from a power substation and controlled lab tests. Moreover, the methods of fingerprint generation according to various embodiments of the present disclosure can be evaluated under simple forgery attacks for different classes of adversary.

Device fingerprinting methods are usually classified into active or passive techniques depending on whether they actively probe a device with specially crafted packets or passively monitor network traffic to develop the fingerprint. One of the oldest fingerprinting tools, Nmap®, uses active fingerprinting techniques to gather information about devices on a network. By sending a series of specific requests, Nmap® determines the operating system (OS) and server versions running on a machine based on how the device responds. While this tool is invaluable for both pen-testers and attackers on a "normal" network, it has limited use in an ICS network where active methods are not as desirable. For passive fingerprinting, a variety of techniques exist that provide both device type fingerprinting and individual device fingerprinting. One example is the open source p0f tool, which passively examines TCP and hypertext transfer protocol (HTTP) header fields to determine information about a client, such as OS and browser version. The first attempt at formalizing methods for active and passive fingerprinting of network protocols was published in 2006, when parametrized extended finite state machine (PEFSMs) were used to model the behavior of different protocol implementations. See G. Shu and D. Lee. Network protocol system fingerprinting—a formal approach. In *INFOCOM 2006. 25th IEEE International Conference on Computer Communications. Proceedings*, pages 1-12, April 2006. Determining software versions is of some use, but identifying individual devices on a network based on their hardware is even more useful, which for example, could be used for tracking a device across the Internet or intrusion detection.

Other passive fingerprinting research has focused on various timing aspects of network traffic to fingerprint devices and device types. In 2010, researchers were able to use wavelet analysis on passively observed traffic flowing through access points to accurately identify each access point. See K. Gao, C. Corbett, and R. Beyah. A passive approach to wireless device fingerprinting. In *Dependable Systems and Networks (DSN)*, 2010 IEEE/IFIP International Conference on, pages 383-392, June 2010. The next year, another paper was published that described a method for device fingerprinting based on models of the timing of a device's implementation of application layer protocols using temporal random parametrized tree extended finite state machines (TR-FSMs). See J. Francois, H. Abdelnur, R. State, and 0. Festor. Ptf: Passive temporal fingerprinting. In *Integrated Network Management (IM)*, 2011 IFIP/IEEE International Symposium on, pages 289-296, May 2011. A third paper that used passive observations of network traffic timing to achieve device fingerprinting was published in 2014, and used distributions of packet inter-arrival times (IAT) to identify devices and device types. See S. Radhakrishnan, A. Uluagac, and R. Beyah. Gtid: A technique for physical device and device type fingerprinting. *Dependable and Secure Computing, IEEE Transactions* on, PP(99):1-1, 2014.

Although there have been many different approaches to using passively observed network traffic timing to perform fingerprinting, they are all infeasible for implementation in an ICS network, and other control systems networks. The wavelet analysis approach was designed and tested only on wireless access points under heavy loads, which is a scenario that does not occur in ICS where wired communication is preferred for its reliability and data rates are relatively low. The method using TR-FSMs only looks at application layer behaviors and requires a large database of all possible sessions. Finally, the method using distributions of IATs requires a large number (at least 2500) of training samples to achieve accurate results, but with some devices on ICS networks being polled at intervals as large as a few seconds, this method would result in unacceptably slow operation. Another technique was developed that used timing measurements of USB enumerations to fingerprint host devices, but this is also impractical in the ICS environment where most devices do not have USB interfaces and where it is desirable to passively fingerprint all devices on the network at once rather than driving out to remote locations to fingerprint each individual device.

Another approach to passive device fingerprinting focuses on the physical layer of device communication, rather than the higher layers. Specifically, amplitude and phase measurements of the signals generated by Wi-Fi radios were used to identify individual devices. However, using amplitude and phase measurements of the signals generated by Wi-Fi radios is still is not feasible in ICS networks, and other control systems networks where Wi-Fi devices are rarely used.

The fingerprinting techniques, according to various embodiments presented in this disclosure overcome the limitations of previous works on device fingerprinting by providing higher accuracy results using techniques that are especially suited for ICS and other cyber-physical systems. One embodiment of the present disclosure improves on more traditional timing-based approaches by using network traffic measurements that are unique to control systems devices. In another embodiment of the present disclosure, the idea of physical layer fingerprinting is extended to identifying ICS control devices based on the reported timings of each device's physical operations. Additionally, all previous fingerprinting work used black box methods that require access to an example target device. Various embodiments of the present disclosure overcome this limitation by proposing a white box fingerprint generation approach that does not need previous access to example devices.

One of the primary uses of the fingerprinting techniques according to various embodiments of the present disclosure, would be to augment existing IDS solutions, of which there is already a significant amount of previous work. The first attempt at tailoring IDS methods for ICS and supervisory control and data acquisition (SCADA) systems focused on monitoring traffic flows for regular patterns and understanding packets at the application layer to look for intrusions. Some researchers have also approached the problem by modifying IDS software to perform specification based intrusion detection for common ICS protocols. Others have attempted to model the states that a process control system can enter and detect when a command might cause it to enter a critical state. These solutions are able to detect some types of attacks, but are unable to detect a class of stealthier ones called false data injection attacks. To address this, some methods have been proposed for power system state estimation and for process control systems. However, they are only useful in the context of power state estimation or where the process behind the control system can be accurately modeled. The fingerprinting methods according to various embodiments of the present disclosure offer novel approaches that can be applied to most ICS networks and other control networks and enable accurate detection of falsified data and control messages.

One of the unique challenges for ICS network security is the vast attack surface available due to the distributed nature of the networks. For example, the electric utility from which experimental data was gathered for this research covers an area of 2800 square miles with 35 substations, where each substation serves as a point of entry to the network. With such a large area to cover, physical security can be extremely difficult to achieve. Therefore, two different attacker models are considered: 1) an outsider who is unable to gain physical access but has compromised a low powered node in the network with malware, and 2) an outsider who is feasibly able to gain physical access to the target network and use his or her own portable machine with standard laptop computing power. The first attacker model was chosen due to how vulnerable these devices are (as evidenced by the 30 year old TCP vulnerabilities found widespread in the power grid) and because it was the method used on the most well-known ICS attack to date, Stuxnet. The second attacker model is realistic in the scenario of a widely distributed control system where physical security can be difficult to achieve.

Referring now to FIG. 1, shown is a schematic representation illustrating an example of a configuration for performing methods of device fingerprinting in a control system environment 100 in conjunction with a traditional intrusion detection system (IDS) 103. When used together according to various embodiments of the present disclosure, the methods of device fingerprinting discussed herein can achieve device fingerprinting from software, hardware, and physics-based perspectives.

Figure 2:
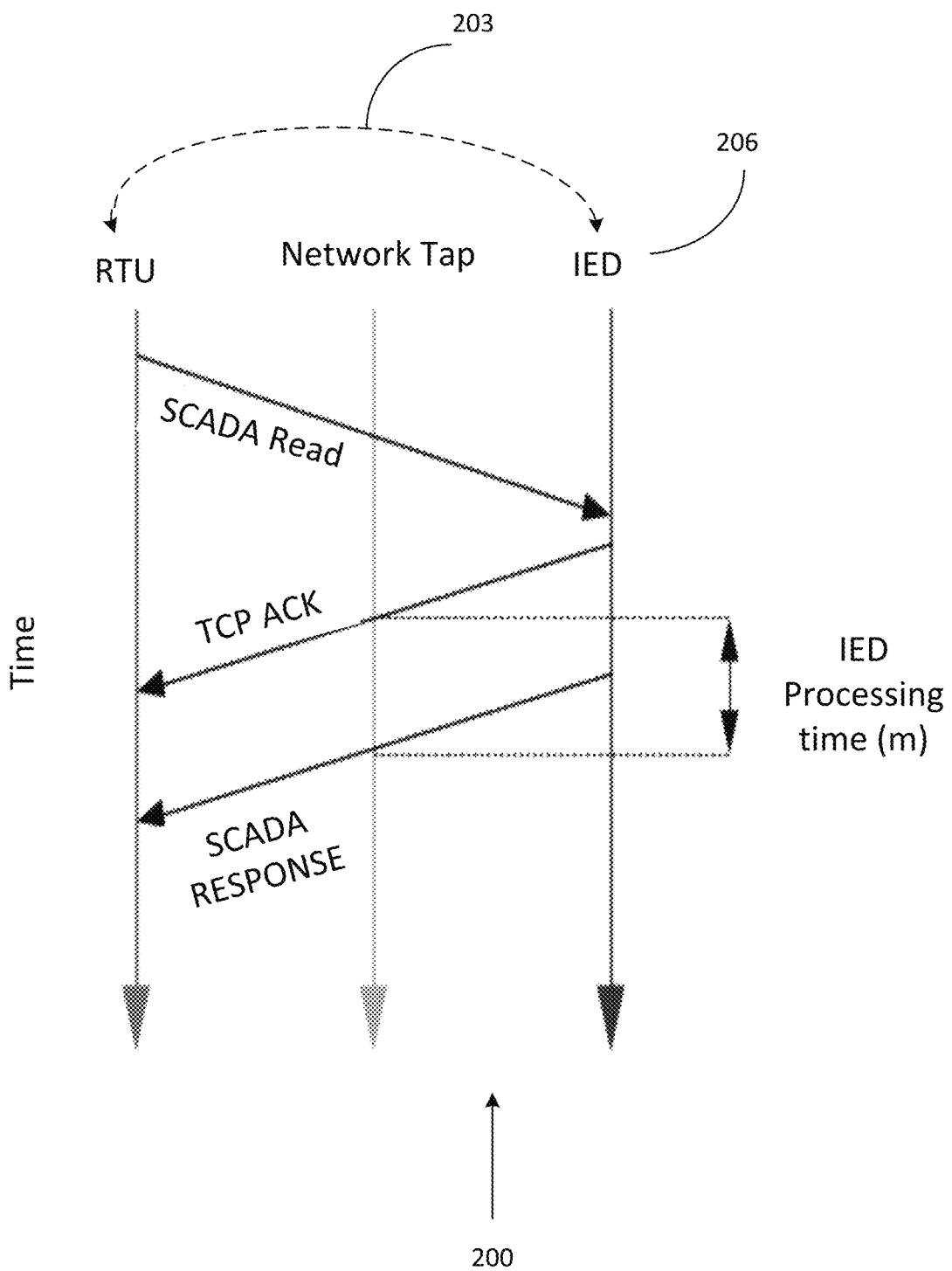
FIG. 2 is a diagram illustrating a measurement of a cross-layer response time according to various embodiments of the present disclosure.

Referring next to FIG. 2, shown is a timing diagram 200 illustrating a cross-layer response time (CLRT) measurement. According to various embodiments, a network monitoring device can be installed in a communication path 203 or can listen to a port that mirrors all traffic on the network. Many control systems protocols operate on top of TCP and use a Read/Response architecture where a master station can send Read requests for measurements to devices in the field and the devices send Responses in return. The network monitoring device can parse fields in network traffic at the TCP level and control system application layer. According to various embodiments, the network monitoring device can parse the application layer headers, store identifying information for each Read request, record the times when the TCP ACK is seen for each Read request, and store the time when the corresponding Response appears for every Read request. Thus, an interaction between regular polling of measurement data at the application layer with acknowledgments at the TCP layer is leveraged to get an estimate of the time that a device 206 takes to process the request. Therefore in various embodiments, a CLRT measurement is the time between when the TCP layer acknowledges that the Read request packet was received and when the application layer sends the Response. In alternative embodiments, a CLRT measurement can be obtained by directly measuring the application layer Response time. After a minimum threshold number of samples, a fingerprint is generated for each device 206 based on the distribution of time that the device 206 takes to process the request. The timing diagram 200 shows how a CLRT measurement can be taken in a typical SCADA network or any other control network, as may be appreciated. It should be noted that since the CLRT measurement is based on the time between two consecutive packets from the same source to the same destination, the measurement can be independent of the round trip time between the two nodes. The fingerprint signature can be defined by a vector of bin counts from a histogram of CLRTs where the final bin includes all values greater than a heuristic threshold. For a formal definition, let M be a set of CLRT measurements from a specific device, B define the number of bins in the histogram (and equivalently the number of features in the signature vector), and H signify the heuristic threshold chosen to be an estimate of the global maximum that CLRT measurements should ever take. The range of possible values can be divided by thresholds $t_i$ where $$t_i = i\frac{H}{B-1},$$

and each element $s_j$ of the signature vector defined by the following equation:

$$sj = \begin{matrix} |\{m : tj-1 \le m < tj, m \in M\}| & 0 < j < B \\ |\{m : m > H, m \in M\}| & j = B \end{matrix} \qquad (1)$$

The CLRT measurement is advantageous for fingerprinting ICS devices because it remains relatively static and its distribution is unique within device types and even software configurations. To understand why this is true for ICS devices, all of the factors which might affect this measurement must be considered.

ICS devices can have simpler hardware and software architectures than general purpose computers because ICS devices are built to perform very specialized critical tasks and can do little else. A typical modern-day computer now has fast multi-core processors in the range of 2-3 GHz with significant caching, gigabytes of RAM, and context switching between the wide variety of processes running on the machine. In contrast, the ICS world is dominated by PLCs running on low powered CPUs in the tens to hundreds of MHz frequencies with little to no caching, tens to hundreds of megabytes of RAM, and very few processes. With such limited computing power available, relatively small changes in programming result in observable timing differences. Depending on the desired task, different ICS device types are built with different hardware specifications (CPU frequencies, memory and bus speeds) as well as different software (operating systems, protocol stack implementations, number of measurements being taken, complexity of control logic) all resulting in each one being able to process requests at different speeds. However most importantly, no matter what kind of ICS network it is in or what physical value the device is measuring (e.g. voltage, pressure, flow rate, temperature), the device is still going to go through the same process of parsing the data request, retrieving the measurement from memory, and sending the response. Therefore, due to the limited processing power and fixed CPU load, CLRT measurements can be leveraged to identify ICS device types, but this does not explain why the CLRT measurements are so constant over the network.

Figure 3:
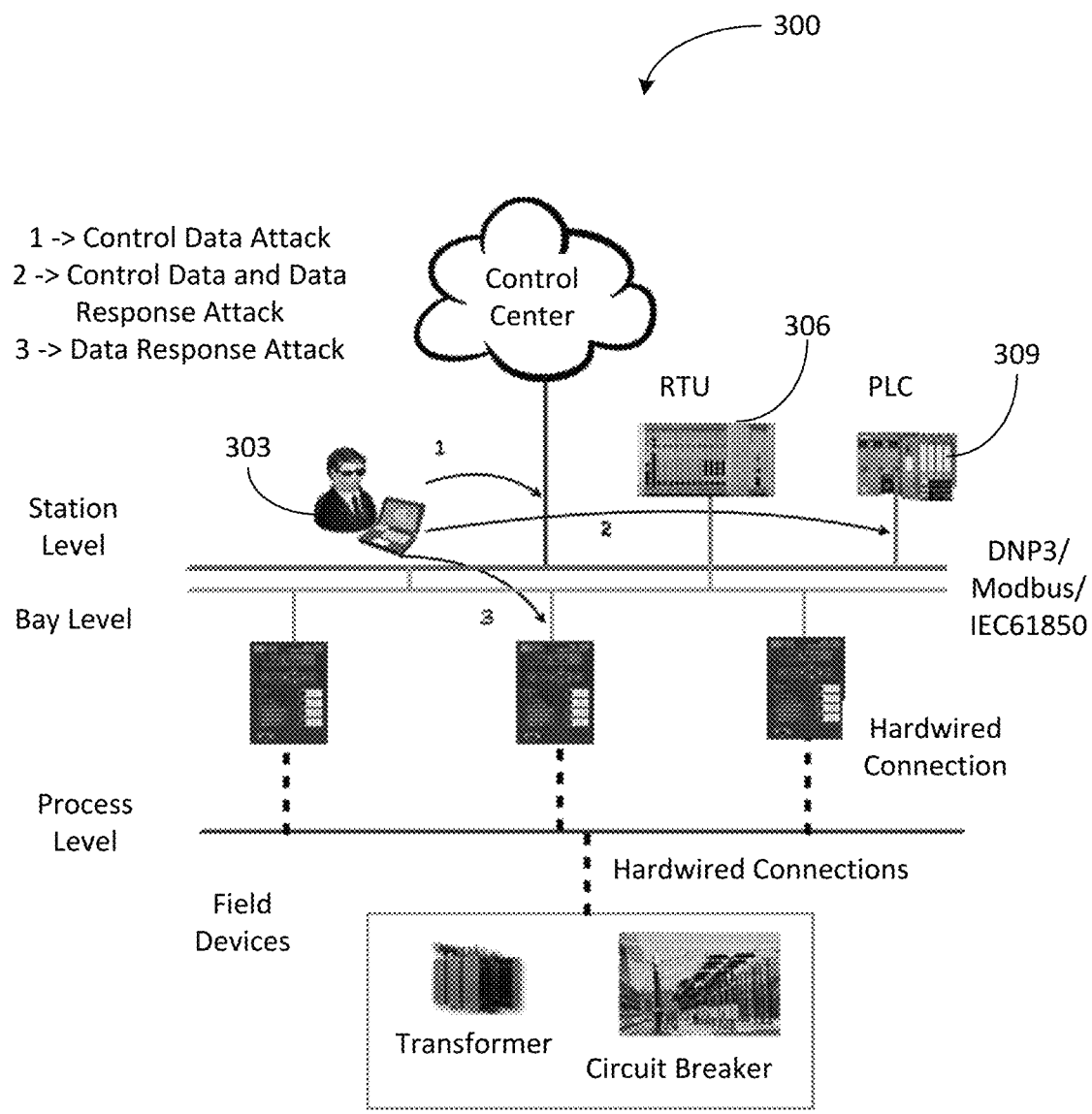
FIG. 3 is a schematic representation illustrating an example of different points of attack that an adversary may exploit when attacking power substation network.

Referring next to FIG. 3, shown is a schematic representation that illustrates different points of attack that an adversary can exploit when attacking a power substation network 300. The adversary 303 can either attack a communication infrastructure or one of a number of individual devices such as a remote terminal unit (RTU) 306 or a programmable logic controller (PLC) 309. Depending on where the network is attacked, the adversary 303 can attempt to inject false data responses, false command responses, or both. As previously discussed, false data and command injections such as these can have disastrous effects on a power grid. Therefore, the device fingerprinting techniques described herein can identify what type of devices these responses are originating from. Such fingerprinting techniques can be important to distinguishing between responses originating from a legitimate intelligent electronic device (IED), an adversary 203 with a laptop who has gained access to the network 300, and a comprised IED posing as a different device on the network 300.

Two of the properties that differentiate ICS networks from more traditional networks are their primary functions of data acquisition through regular polling for measurements and control commands. These properties hold true for all of the most critical ICS networks regardless of the underlying physical process, including the distribution of power, water, oil, and natural gas. The fingerprinting techniques according to various embodiments of the present disclosure, take advantage of these unique properties and are explained using the power grid as a specific example. One embodiment is evaluated using data from a live power substation and verified with controlled lab experiments. Another embodiment is evaluated only with lab experiments due to the relatively rare occurrence of operations in the given dataset, but it should be noted that other power grid networks and industries, such as oil and gas, have more frequent operations.

Figure 4A:
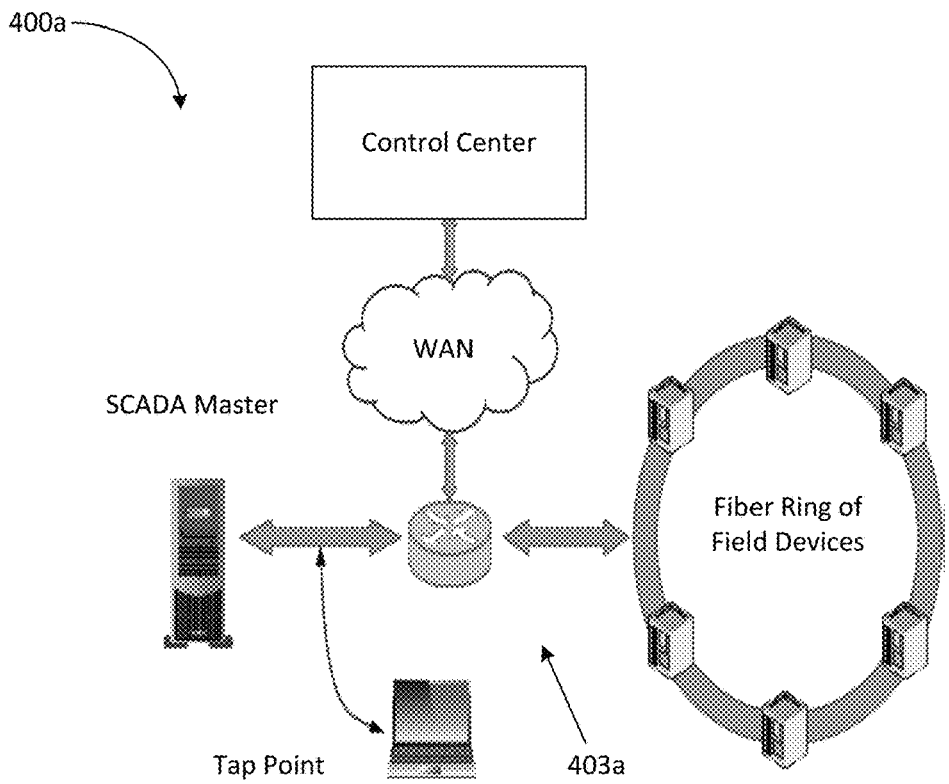
FIGS. 4a and 4b show examples of network architectures used to test a cross-layer response time method of device fingerprinting according to various embodiments of the present disclosure.
Figure 4B:
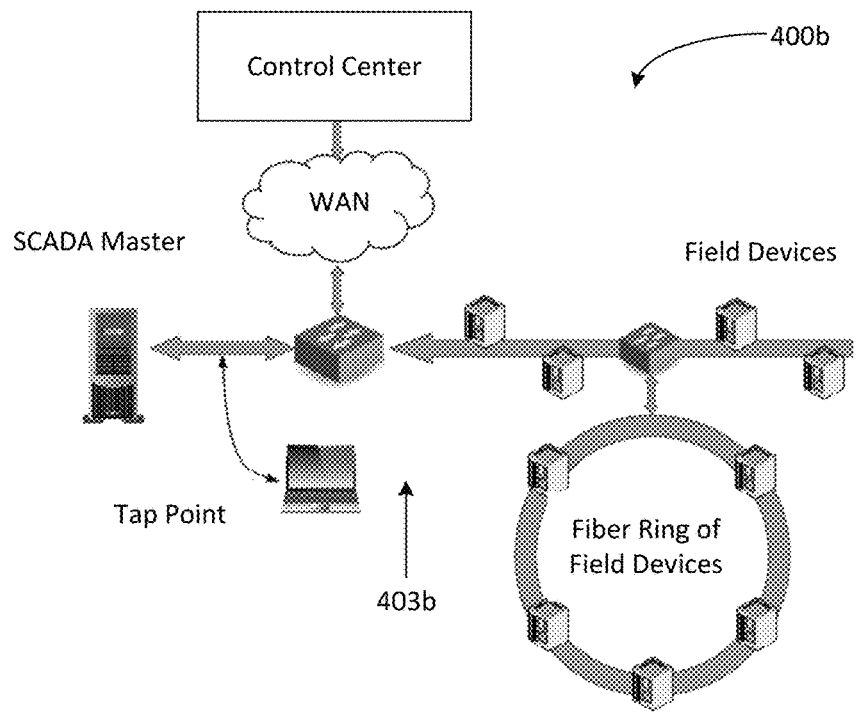

Referring next to FIGS. 4a and 4b, shown are examples of network architectures 400a and 400b used to test a cross-layer response time (CLRT) method of device fingerprinting. Although the use case for this technique of CLRT device fingerprinting (as in the deployment of any anomaly-based IDS) would involve a training period on each target network, one of the desired properties for device fingerprinting in general is that the network architecture of the target not be a significant factor.

In a traditional corporate network, mobile phones and laptops are constantly moving around and connecting to different wireless access points. The traffic they are generating is traveling over vast distances, encountering routers that are experiencing unpredictable loads, and consecutive packets are never guaranteed to take the same path over the Internet. However, devices in ICS networks are dedicated to one critical task and are fixed in a permanent location. The traffic generated from their regular polling intervals travel over relatively short geographic distances and over simple network architectures that offer little to no chance for consecutive packets to take different paths. The regular polling cycle means that routers and switches on ICS networks have consistent predictable loads which result in consistent and predictable queuing delays. Consequently for any given ICS network, there is an extremely high probability that a TCP ACK and SCADA response sent in quick succession will take the same exact path, encounter the same delay, and therefore have a very consistent spacing in between them. Therefore, there is little opportunity for differences in network architecture to cause significant changes in the distribution of CLRTs. Studying the fingerprints from the first substation 403a and testing the fingerprints over a year later on the second substation 403b can provide insight into how much a change in networks effects the performance.

Due to the low computational power found in ICS devices, the CLRT measurements are much larger than most delays that might be caused by differences in network architecture. In the real-world dataset used for this research, illustrated in the form of a scatter plot depicted in FIG. 5, the CLRT measurements are all on the order of tens or even hundreds of milliseconds. By contrast, typical latencies obtained from ICS network switch datasheets and theoretical transmission delays on a 100 Mbps link are both on the order of microseconds, resulting in a minor contribution to the overall CLRT measurement. Furthermore, ICS networks most often have overprovisioned available bandwidth to ensure reliability (e.g. the first substation network studied for this research used an average of 11 Kbps bandwidth out of the available 100 Mbps, a strikingly low traffic intensity of 0.01%). These low traffic intensities ensure that the switches and routers on the network are never heavily loaded and have consistently low queuing delays.

Finally, even in the scenario where two network architectures are so different as to significantly alter the distribution of CLRTs, the defensive utility of the proposed device fingerprinting methods would not be significantly affected. Any real-world application of the fingerprinting technique would involve a training period on the target network that would capture the minor effects of the network architecture. Then, if an attacker were attempting to create an offline database of signatures for all device types and software configurations without access to the specific target network, he or she would also have to consider all the possible network architectures that could affect them.

Due to this combination of low computational power, fixed CPU loads, and simple networks with predictable traffic, any significant change in a device's distribution of CLRTs highly suggests either an attacker spoofing the responses with a different machine, or a change in CPU workload or software configuration, which could be a sign of a device being compromised with malware.

FIG. 4(a) shows a first network architecture 400a of a first substation 403a. Approximately 20 GB of network traffic was captured from the first substation 403a with approximately 130 field devices running a distributed network protocol (DNP3) over a span of five months within the first network architecture 400a. Then, over a year later, one more month of data was captured from the first substation 403a after the first network architecture 400a was slightly modified by replacing the main router with a new switch, changing the IP addressing scheme accordingly, and increasing the frequency of measurement polling.

Next, an overnight capture was collected from a second substation 403b with a second network architecture 400b depicted in FIG. 4(b). The second architecture 400b comprises approximately 80 field devices using DNP3 to test if device fingerprints learned on the first network architecture 400a would translate to another network architecture. Further tests were conducted in the lab to study the effects on the software configuration alone and to rule out any possible factors related to different hardware or different round-trip times (RTT) on the network.

In both scenarios, cross-layer response time measurements were taken from DNP3 polling requests for event data and were summarized by dividing all measurements into time slices (e.g., one hour, or one day) and calculating means, variances, and 200-bin histograms for each time slice. Machine learning techniques were then evaluated using two different feature vectors: a more complex approach using the arrays of bin counts as defined in the equation below and a simple approach using arrays containing only the mean and variance for each time slice.

Figure 5A:
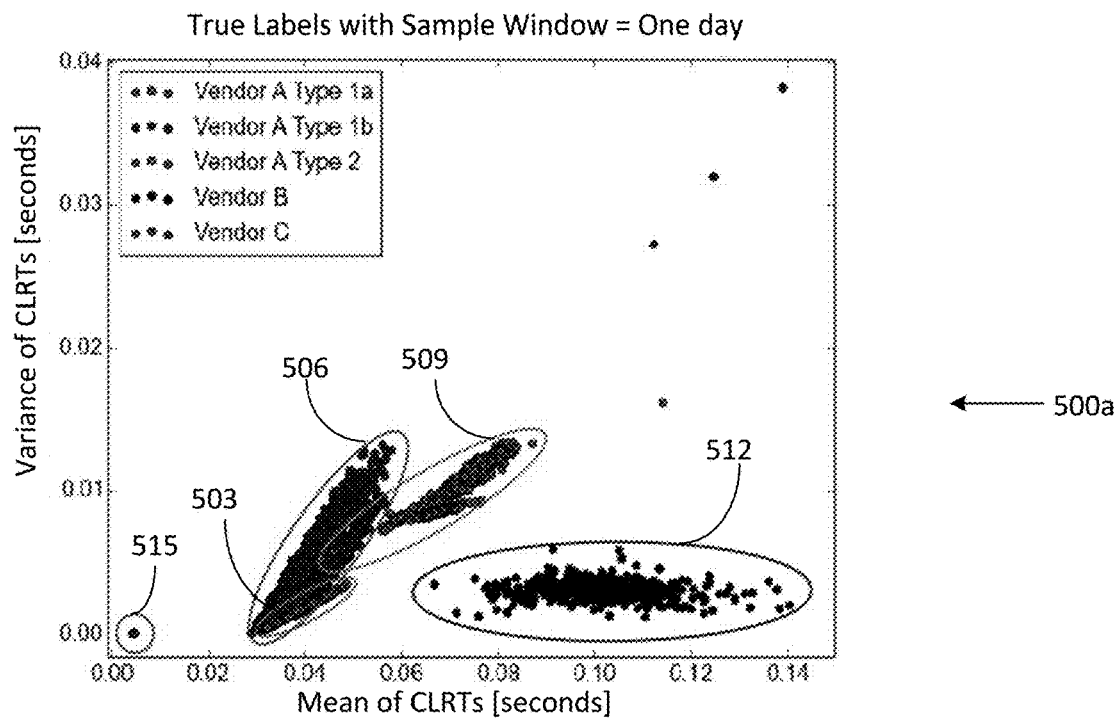
FIGS. 5a and 5b show an example scatterplot of cross-layer response times for sample ICS devices and corresponding probability density functions (PDFs) for the sample ICS devices.
Figure 5B:
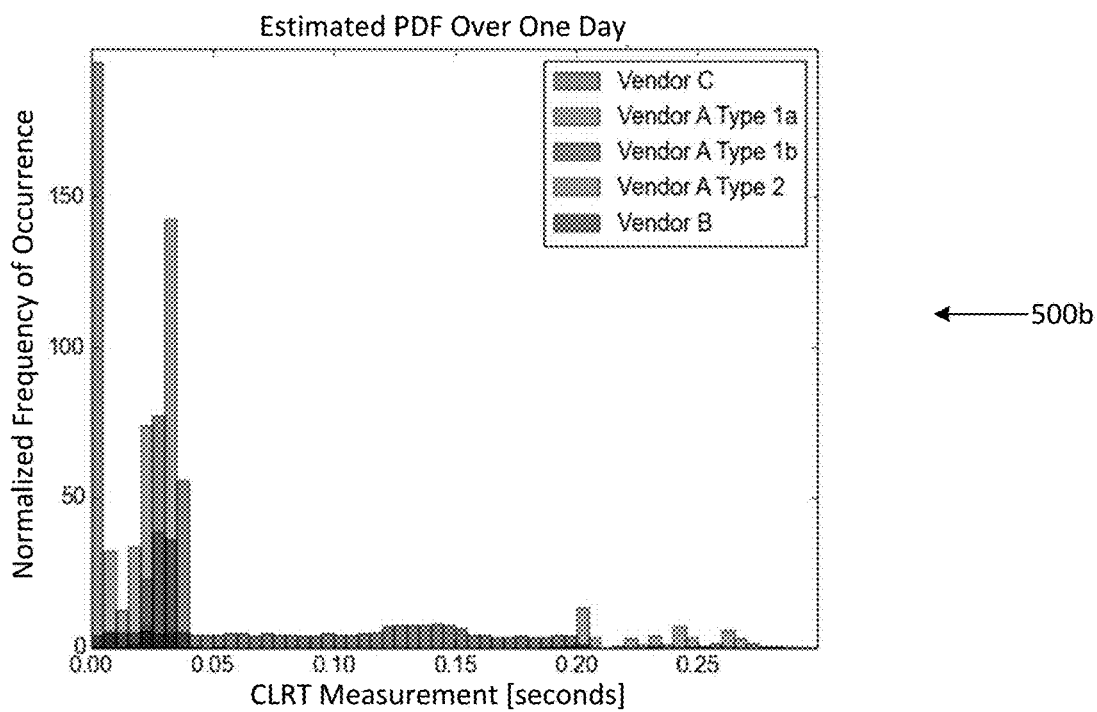

Referring next to FIG. 5(a), shown is an example of a scatterplot of cross-layer response times (CLRTs) for sample ICS devices. The corresponding probability density functions (PDFs) 500b for the sample ICS devices are shown in FIG. 5(b). To obtain a rough visualization of the separability of the device types based on their CLRT measurements, a scatter plot 500a based on the mean and variances of CLRTs was produced and the true labels of the devices are illustrated in FIG. 5(a). Each point in the scatter plot 500a represents the mean and variance of the CLRT measurements for one IP address over the course of one day out of the original five month dataset. From the scatter plot 500a it can be seen that using simple metrics such as means and variances, the CLRT measurements for vendors and hardware device types are highly separable. The scatter plot 500 shows the highly separable hardware device types of Vendor A (Types 1a 503, 1b 506, and 2 509), Vendor B 512, and Vendor C 515. Furthermore, the scatter plot 500a shows that identical hardware device types can be subdivided into classes based on different software configurations represented by Vendor A Type 1a 503 and Vendor A Type 1b 506. These conclusions are further supported when the corresponding PDFs 500b of CLRTs over a day were estimated for each type in FIG. 5(b).

Since FIG. 5(a) illustrates that device types are clearly separable based on simple mean and variance measurements, many choices of a properly-tuned machine learning algorithm can result in high accuracy classification. Therefore, a sampling of the most popular algorithms in the field were chosen as examples. To measure the performance of our fingerprinting techniques throughout, the standard classification metrics of accuracy, precision, and recall as defined in Equations 2, 3, and 4 are calculated for each class separately, where TP, TN, FP, and FN stand for true positive, true negative, false positive, and false negative, respectively. To summarize these results, the average value across classes was plotted alongside the minimum value among classes.

$$ACC = \frac{TP + TN}{TP + TN + FP + FN} \quad (2)$$

$$PREC = \frac{TP}{TP + FP} \quad (3)$$

$$REC = \frac{TP}{TP + FN} \quad (4)$$

Figure 6:
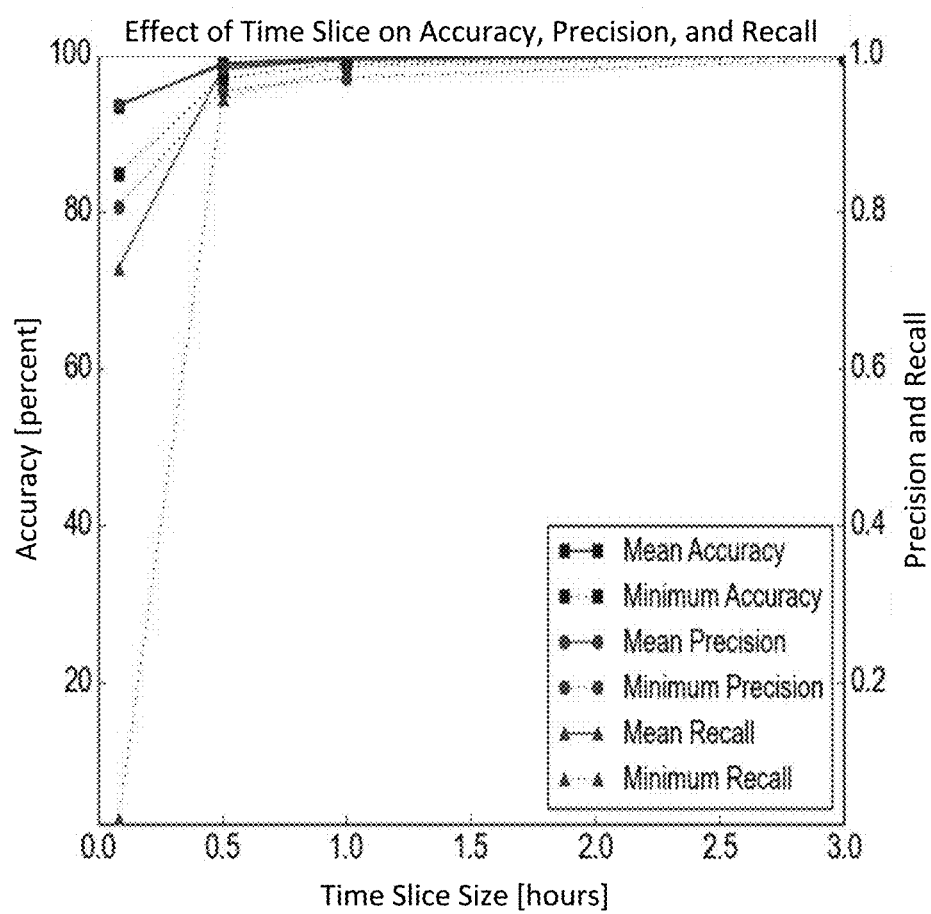
FIG. 6 shows an example of fingerprint classification performance using FF-ANN.

Referring next to FIG. 6, shown are results of fingerprinting classification performance using a feed forward artificial neural network (FF-ANN) with one hidden layer trained using the back propagation algorithm. The bin counts of the histograms, as defined in Equation 1, were used as the feature vector for each sample and the time slice they were taken over was varied. The samples were randomly divided using 75% as training data and 25% as testing data.

The results of the average and minimum accuracy, precision, and recall for these experiments shown in FIG. 6, illustrate that even with time slices as small as 5 minutes, an average accuracy of 93% can be achieved. Some devices at the substation were being polled only once every 2 minutes, so the 5 minute detection time is roughly equivalent to a decision after only two samples. Furthermore, when false data is injected into a control system, catastrophic damage usually cannot immediately occur due to built-in safety features in the control system. The most successful attacks can sabotage equipment or product over an extended period of time, for example, by tricking a control system into heating a reactor past its limits and causing it to explode.

To demonstrate that the exact choice of machine learning algorithm is largely irrelevant, supervised learning was attempted using one of the simplest algorithms, a multinomial naïve Bayes classifier. The signature vectors remained the same and similar experiments were conducted to determine the required training period and detection time. Furthermore, these tests were conducted to simulate a real-world deployment instead of randomly choosing training and test data, the training data was taken from the beginning of the capture and the test data was taken from the following 1000 detection time windows. The results indicate that the simple Bayes classifier performs even better than the more complex ANN and can achieve high accuracy classification with detection times as small as a few minutes.

The results discussed above are extremely promising for supervised learning when a list of IP addresses and corresponding device types are available. However, this may not be the case for administrators trying to understand what devices are on a poorly documented legacy network. To address this scenario, unsupervised learning techniques were also applied and tested to determine if they could accurately cluster the devices into their true classes. Referring back to FIG. 5(a), it is clear that the samples closely follow a multivariate Gaussian distribution. Thus, an illustration of unsupervised learning with Gaussian mixture models (GMM) using a full covariance matrix and a signature vector consisting of means and variances with a time slice of one day was demonstrated. Results show that the estimated clusters learned from the GMM algorithm, which upon comparison with the true clusters in FIG. 5(a), look very similar. When the dataset was tested against the learned clusters, the model achieved an accuracy of 92.86%, a precision of 0.891, and a recall of 0.956. With performance as nearly as high as the supervised learning methods, this unsupervised technique can allow administrators to develop an accurate database of fingerprints with little knowledge of the network itself.

While the previous experiments, simulating a real-world deployment with a training period on the target network, performed very well, it was necessary to study how much the network architecture affects the performance of the fingerprinting techniques. For the first experiment to study these effects, the first substation was revisited over a year later after the first network architecture (FIG. 4a) had been upgraded and polling frequency had been increased.

Figure 7A:
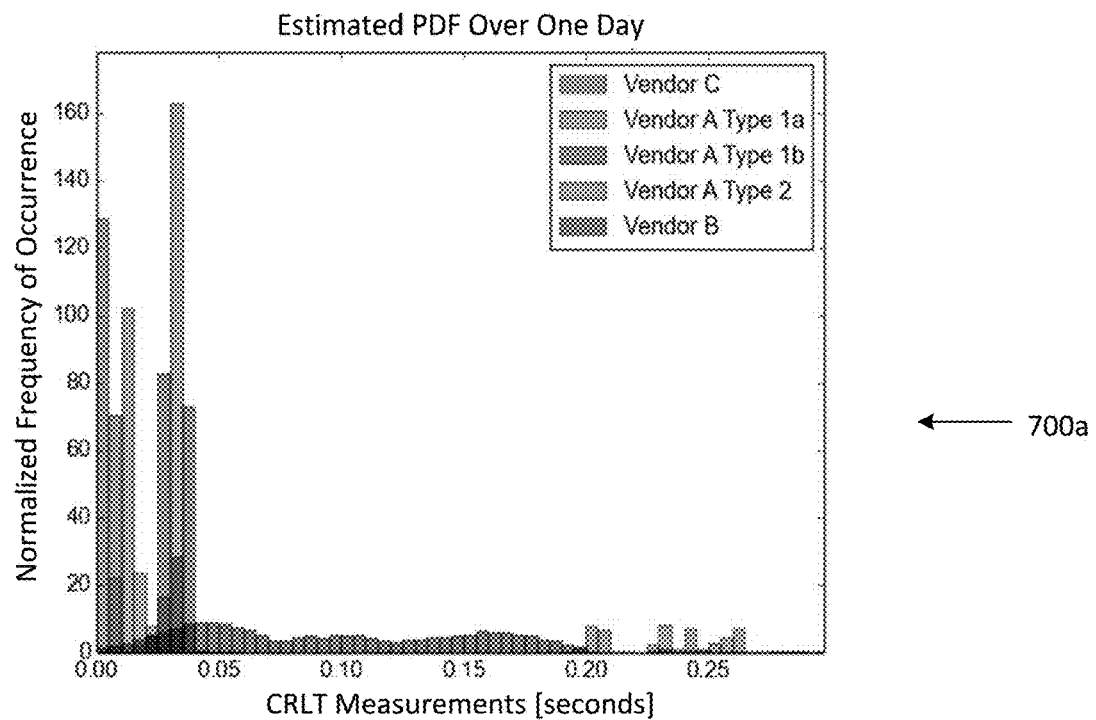
FIGS. 7a and 7b show estimated probability density functions (PDFs) for the sample ICS devices after upgrades to network architecture and an increase in polling frequency.

Referring next to FIG. 7(a), shown is the CLRT distribution 700a after changes were made to the first network architecture in FIG. 4(a). When the CLRT distribution with the new network architecture in FIG. 4(b) is compared with the original in FIG. 4(a), there are only minor differences. When the fingerprints learned from the original capture were tested on the new data, very high accuracies in were obtained, which shows that the method is stable over long periods of time and over minor changes in the same network.

Figure 7B:
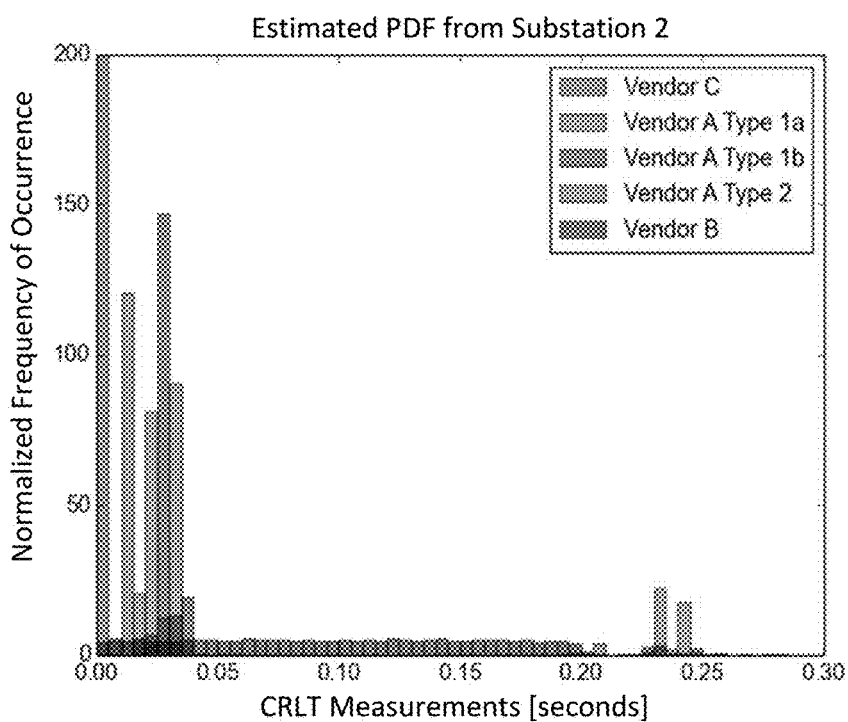

The primary defensive use-case for this technique would involve a training period on the target network. However, the rare case where an administrator is able to learn fingerprints on one network because of known labels, but does not have the labels for a different network is considered. To study this scenario, fingerprints from the original capture were studied and tested on a different substation over a year later. When the different substation's distribution in FIG. 7(b) is compared with the original there are some small, but noticeable changes that could be result of the different architecture affecting the timings or from the different electrical circuit affecting the load of the devices. When the fingerprints learned from the original capture were tested on this different network, the average accuracy seemed to level off around 90%, suggesting that while the accuracy may be diminished across different networks, there is still some utility in the technique.

Finally, to show that the technique performs well on different networks when trained individually, a Bayes classifier on one hour of data from the second substation was trained and tested on the remaining seventeen hours of data.

Figure 8:
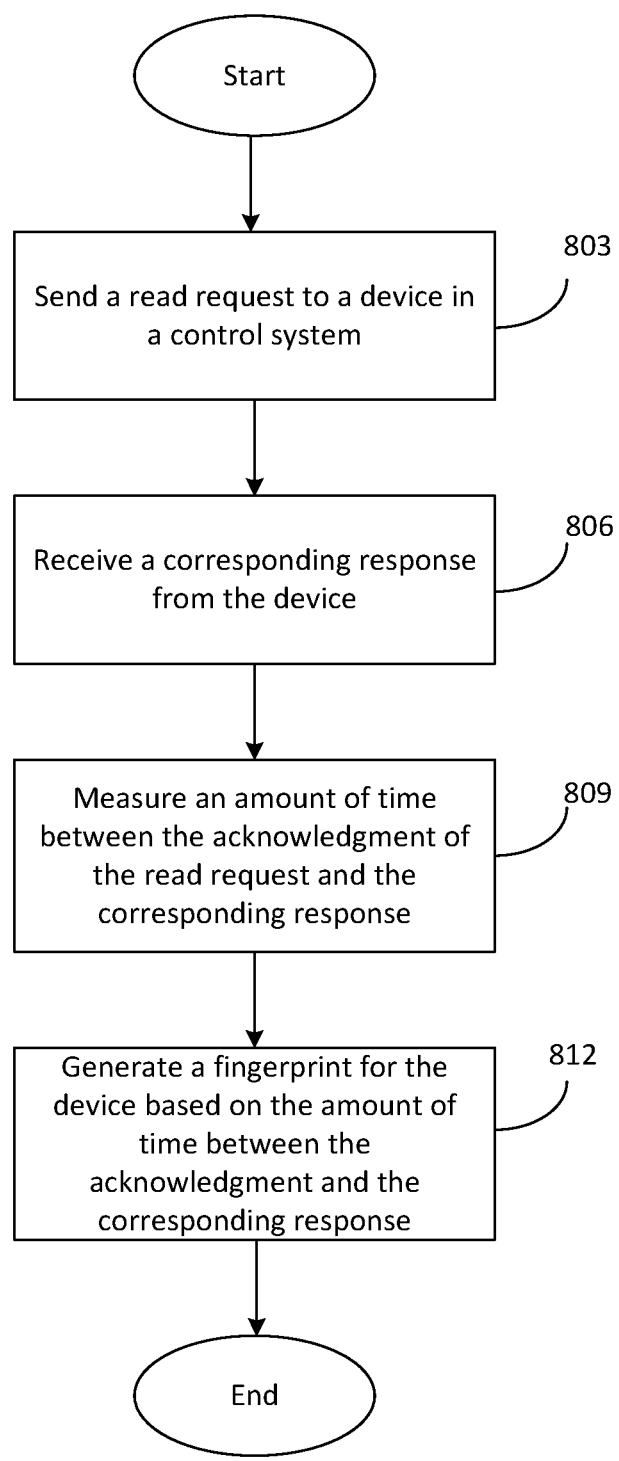
FIG. 8 is a flowchart illustrating one example of a method of cross-layer response time device fingerprinting according to various embodiments of the present disclosure.

Referring next to FIG. 8, shown is a flowchart illustrating one example of a method of cross-layer response time device fingerprinting. Beginning at box 803, a read request is sent to a device in a control system. The device may be for example, an RTU, an TED, or any other device in a control system, as can be appreciated. Next, in box 806, a corresponding response to each read request is received from the device. Then, in box 809, an amount of time between an acknowledgment of each read request and a time when a corresponding response is received is measured. Finally, in box 812, a fingerprint is generated for the device based on the amount of time that is measured. A minimum number of measurements for the device can be required for the fingerprint to be generated. For example, a minimum threshold of 1000 samples (or other defined threshold) for the device may be required for the fingerprint.

Figure 9:
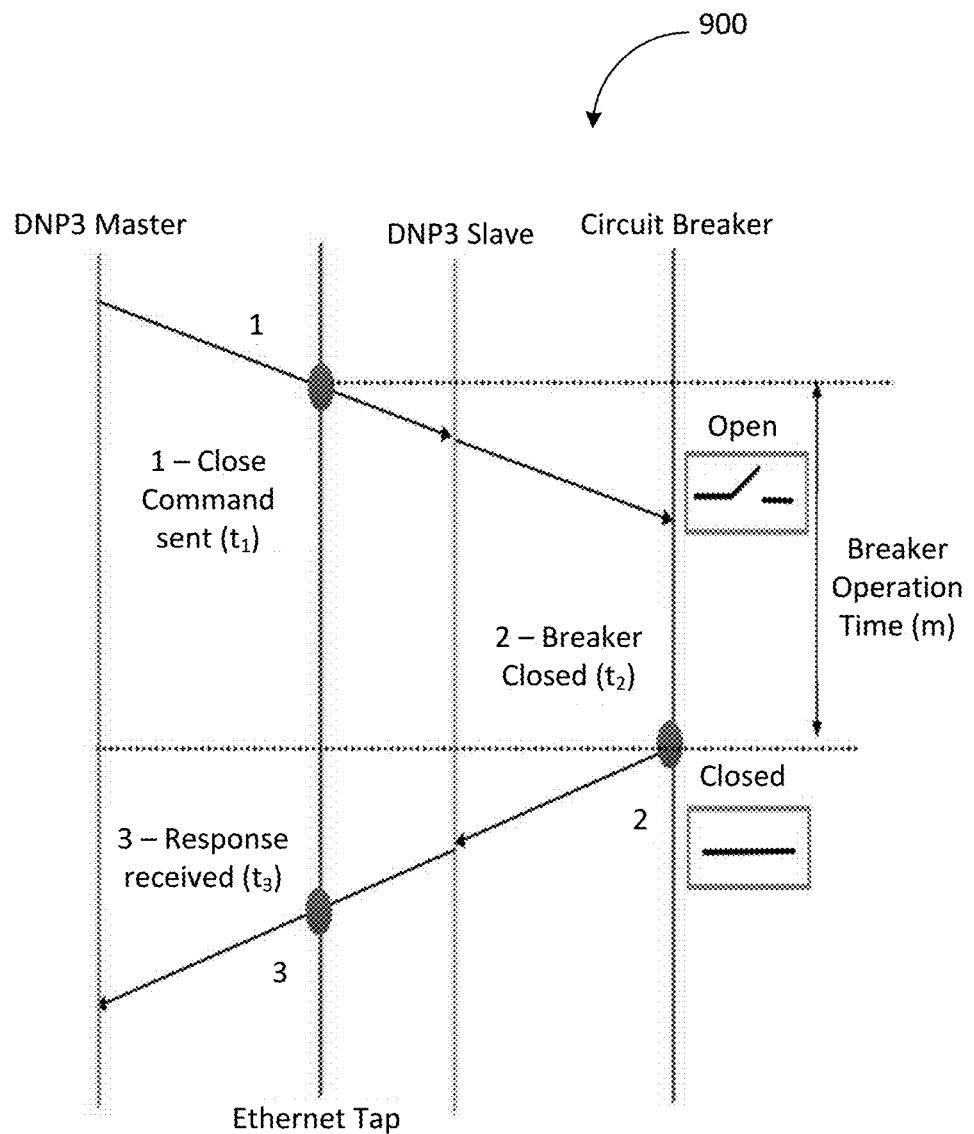
FIG. 9 is a timing diagram illustrating a calculation physical operation times according to various embodiments of the present disclosure.

In addition to using CLRT fingerprinting in conjunction with traditional IDS, physical device fingerprinting can also be used to fingerprint devices in a control system environment. Referring next to FIG. 9, shown is a timing diagram 900 illustrating a calculation of physical operation times. According to various embodiments, physical devices can be fingerprinted based on each device's unique physical properties and characteristics. A series of operation time measurements can be taken and used to build an estimated distribution and generate a signature. The formal definition of the signature follows the same logic as Equation 1 above, but with M being defined as a set of operation time measurements and H being a heuristic threshold chosen to be an estimate of the maximum value an operation should ever take.

The mechanical and physical properties defining how quickly a device operates differs between devices and produces a unique fingerprint for each device. For example, analyzing the difference in operation times of latching relays that use a solenoid coil arrangement shows that a unique fingerprint is produced for each device. Relays were chosen for this research as they are commonly used in ICS networks for controlling and switching higher power circuits with low power control signals. The electromagnetic force produced while energizing the solenoid coil in a latching relay is directly proportional to current though the solenoid, number of turns in the solenoid, and the cross sectional area and type of core, as described by the equation below, where N is the number of turns in the solenoid, I is the current in amperes running through the solenoid, A is the cross-sectional area in meters-squared of the solenoidal magnet, g is the distance in meters between the magnet and piece of metal, and $\mu_0$ is the constant $4\pi*10^{-7}$.

$$F=(N*I)^2 \mu_0 A/2g^2 \qquad (5)$$

This electromagnetic force governs the operation time, and modification of any one of these variables due to differing vendor implementations results in unique signatures. In addition to proposing a specific distribution for devices based on vendor, individual physical operations like open or close will also produce a difference in operation times. This difference can be attributed to the different forces involved in completing the physical action. When a breaker or relay responds to an operate command from a DNP3 master device, an event change is observed at the slave device. With unsolicited responses enabled in the slave device, it asynchronously responds back with a message on an event change, which can be observed with a network tap to calculate the operation time. The response can also contain a sequence of event recorder (SER) timestamp indicating the time that the event occurred. Therefore, operation times can be estimated based on at least two different methods:

1) Unsolicited Response Timestamps—calculated by the OS at the tap point by taking the difference between the time at which the command was observed and the time at which the response was observed. $m=t_3-t_1$.
2) SER Response Timestamps—calculated from the difference between the time at which the command was observed at the tap point and the application layer event timestamp. $m=t_2-t_1$.

Figure 10:
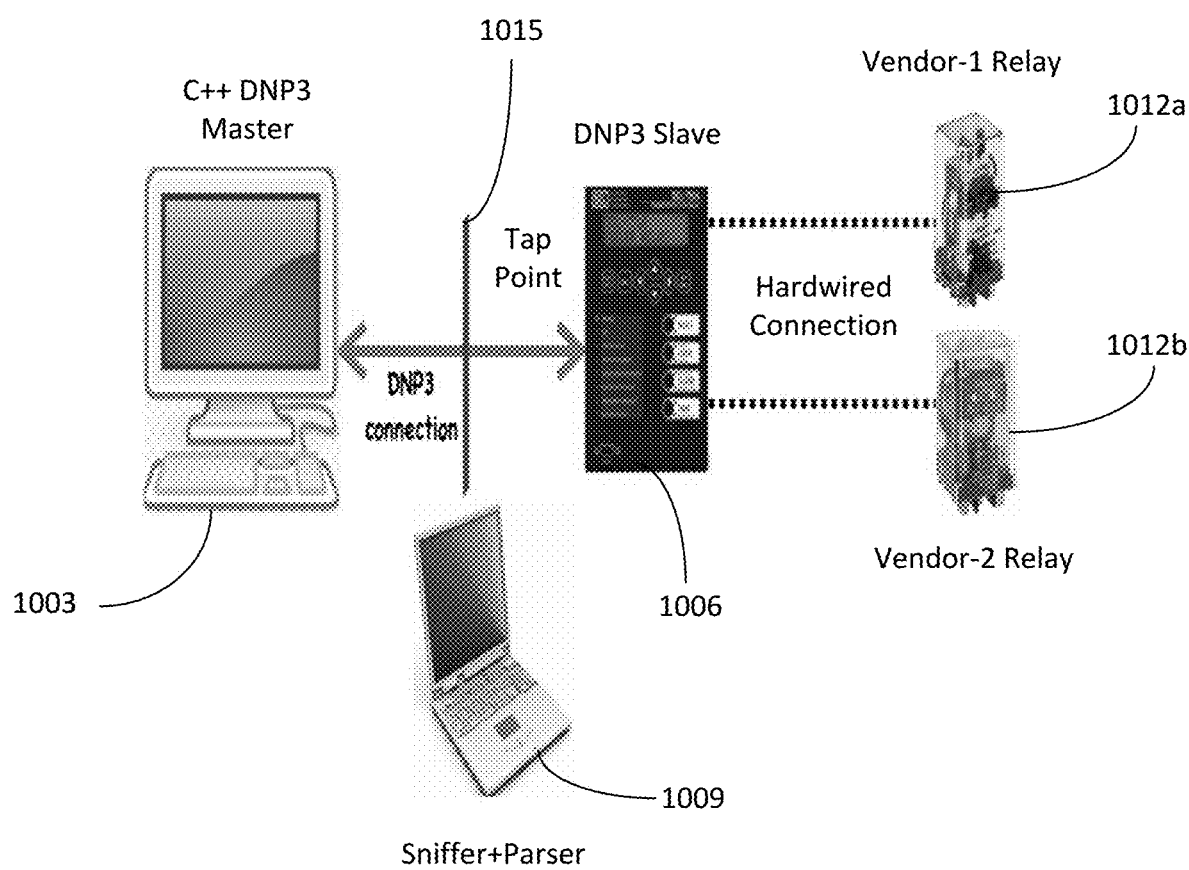
FIG. 10 is a schematic representation illustrating an example of a configuration for testing physical device fingerprinting according to various embodiments of the present disclosure.

Referring next to FIG. 10, shown is a schematic representation illustrating an example of a configuration for testing physical device fingerprinting. To demonstrate the proposed approach, a circuit breaker operation was chosen. The experimental setup consisted of a DNP3 master device 1003 from a C++ open source DNP3 implementation (OpenDNP3 version 2.0), an SEL-751A DNP3 slave device 1006 and two latching relays 1012a and 1012b to demonstrate physical device fingerprinting based on operation time. The SEL-751A DNP3 slave device 1006 is connected to the two latching relays 1012a and 1012b by hardwired connections. At a tap point 1015 in FIG. 10, a C based DNP3 sniffer 1009 is used to sniff and parse the DNP3 packets to perform deep packet inspection. At the tap point 1015, the packets are timestamped by the Linux operating system which is time-synchronized by the same time source as that of the DNP3 master device 1003 and SEL-751A DNP3 slave device 1006.

The SEL-751A IED is a feeder protection relay supporting Modbus, DNP3, IEC61850 protocol, time synchronization based on SNTP protocol, and a fast SER protocol which timestamps events with millisecond resolution. The experimental setup for both relays 1012a and 1012b consisted of a latching circuit and a load circuit.

The latching circuit works on an operating voltage of 24 VDC needing about 1A to operate and load circuit is based on 110V to be compatible with the IED's inputs. On a close command from the DNP3 master device 1003, the IED activates a binary output energizing a latch coil to close the load circuit. Once the load circuit is energized, the binary input senses the change and a timestamped event is generated. On an open command from the DNP3 master device 1003, the IED activates the second binary output energizing the reset coil to open the load circuit, which is recorded as a timestamped event. For these experiments, 2500 DNP3 open and close commands were issued simultaneously to both the latching relays 1012a and 1012b with an idle time of 20 seconds between operations. The commands and responses were recorded at the tap point 1015 and operation times were calculated using both the unsolicited response method and SER-based method. The SER-based method results are described below and retained as the physical fingerprint.

Figure 11:
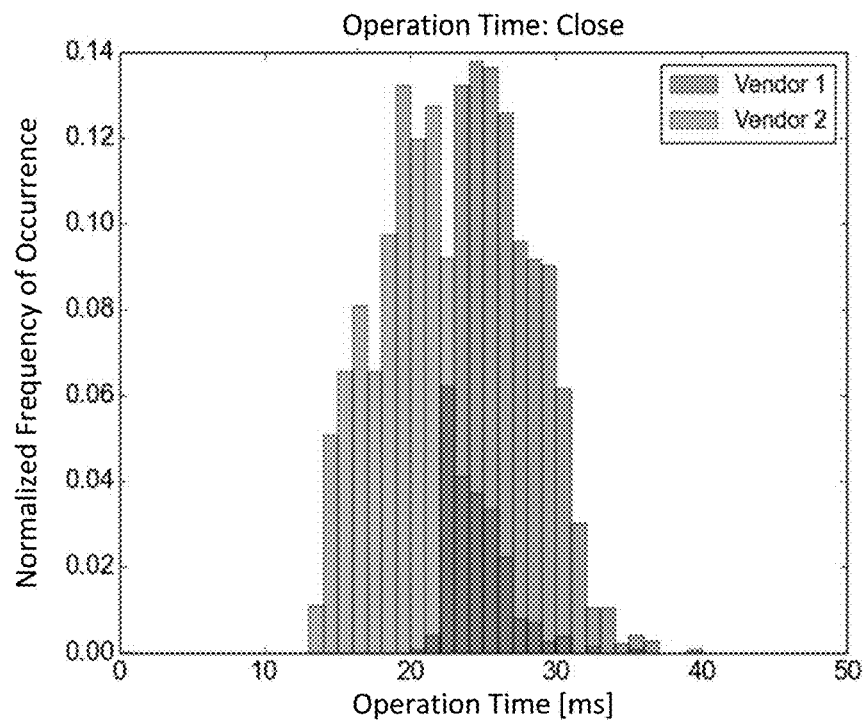
FIG. 11 shows graphs illustrating the distribution of close operation times based on SER responses and open operation times based on SER responses.
Figure 11:
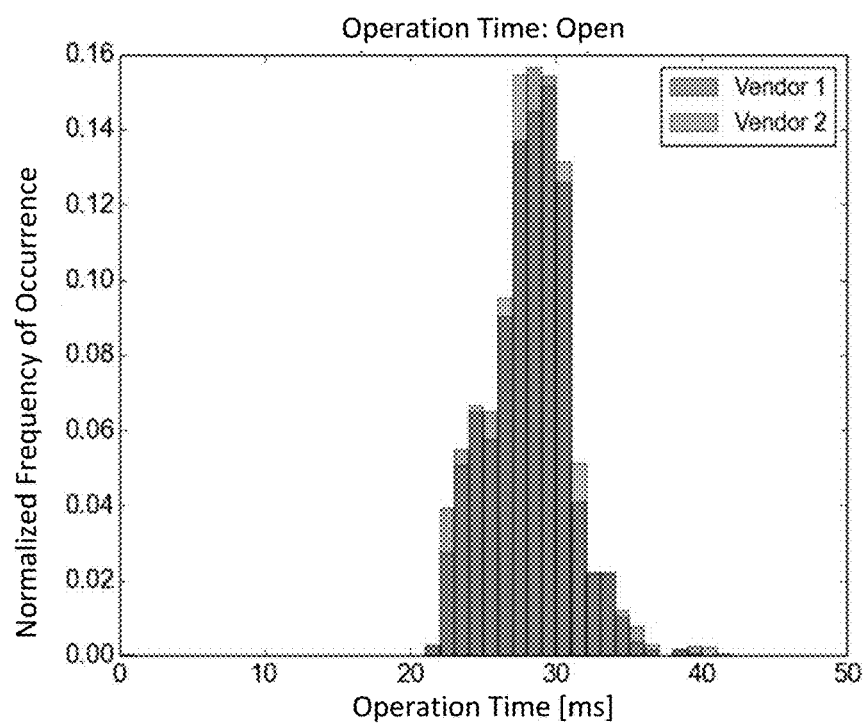

Referring next to FIG. 11, shown are the distributions of close operation times based on SER timestamps for the latching relays 1012a and 1012b (FIG. 10) from two different vendors. The times range from 16 ms to 38 ms for Vendor 1 and 14 ms to 33 ms for Vendor 2. Even though both latching relays 1012a and 1012b (FIG. 10) have similar ratings, the difference in operation can be attributed to the difference in physical makeup between them. For example, one of the latching relays had a larger cross sectional area for its solenoid, resulting in different forces produced. When the same FF-ANN techniques as the first method were applied to classify the latches based on SER time-stamped operations, the accuracy leveled off around 86%. Note that the large fluctuations appear to be a result of overfitting, causing one class's performance to improve significantly at the cost of the other.

When the naïve Bayes classifier was applied to this problem slightly better results were obtained that leveled off around 92% accuracy, which suggests that any properly tuned machine learning algorithm can perform well. The distribution of open operation times for the two different latching relays 1012a and 1012b (FIG. 10) shows little variation between the two, which makes it difficult for these times to be used for accurate device fingerprinting.

The previous results found that close operation times help distinguish between latching relays of two different vendors, but it would also be desirable to distinguish between types of operations for a single device, for example, to determine if a device had opened or closed in response to a command. The distribution of open and close operations for Vendor 2's latching relay has noticeable differences. These differences can be attributed to the physical construction of the components that act to open or close the relay, as discussed in detail below.

On repeating the experiments for Vendor 1's latching relay, the distribution of open and close operation times again showed clear distinctions and similar conclusions can be drawn as to the underlying causes. Therefore, even though the open operation does not help distinguish between two vendors in this case, the results suggest that generally, case operations are distinguishable from one another and could potentially be used in other scenarios.

Figure 12:
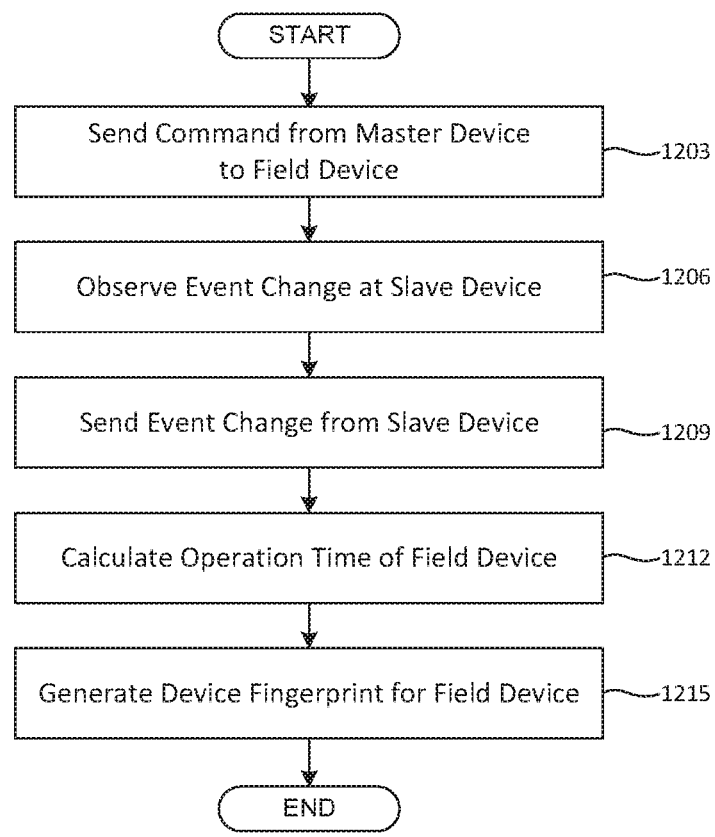
FIG. 12 is a flowchart illustrating one example of a method of physical device fingerprinting according to various embodiments of the present disclosure.

Referring next to FIG. 12, shown is a flowchart illustrating one example of a method of physical device fingerprinting. Beginning in box 1203, a command is sent from a master device to a field device to perform an operation. The command can comprise, for example, a request to open a load circuit. The command can comprise, for example, a request to close a load circuit. Next, at box 1206, an event change is observed at a slave device. The slave device can be for example, a DNP3 slave. The slave device can be connected to the field device via, for example, hardwire connections. Then, at box 1209, a message indicating the event change is sent by the slave device. Then, at box 1212, an operation time of the field device is calculated based at least in part upon a time at which the message was observed. The message can be observed at, for example, a network tap. Finally, at box 1215, a fingerprint for the field device is generated based at least in part upon the operation time. A minimum number threshold of measured operation times can be required before a fingerprint is generated.

The CLRT technique fingerprints and the physical device fingerprints were generated using black box methods that assume some access to the target devices. The CLRT technique is based on monitoring of data packets requires a black box modeling approach as neither the internal circuitry nor the device source code is usually available (and thus there is no basis for constructing a white box model). Alternatively, the physical device fingerprinting technique may leverage a white box, black box, or gray box modeling approach since the mechanical composition of a device can usually be obtained from manual inspection, available drawings/pictures, or manufacturer's specifications. The ability to construct white box model fingerprints for physical device fingerprinting is important due to the rare operation of some devices, and the prohibitive cost of performing black box modeling on all of the available devices on the market. To illustrate this technique, construction of the same fingerprint for the latch relay mechanism is discussed using white box modeling only and then validates it against the black box model results obtained for the device. However, a gray box modeling approach could be pursued as a general methodology for physical signature generation.

To demonstrate the physical device fingerprinting process, a standard latch relay is considered. This latch relay operates using the principle of remnant magnetization in which a coil magnetizes a permanent magnet in either direction during opening and closing operations. To construct a dynamic model for the device, the latch relay was disassembled and its basic components modeled. A magnetic armature of length L is connected to the base assembly by a torsional spring of spring constant k. The torsional spring is preloaded so that it applies a torque which pushes the armature to the open position by default. A permanent magnet lies at a distance l along the armature and is assumed to exert a magnetic force $F_p$ at a single point along the armature. Furthermore, the permanent magnet is surrounded by a wire coil which carries the input current α(t), and also applies a magnetic force $F_c$ to the armature. The magnetic field from the coil pulse drives the magnetic field of the permanent magnet to be in the same direction. After the driving field is removed, the permanent magnet holds the field in the same direction by the property of remnant magnetization. This process is what "latches" the relay.

To switch the latch relay, a current is applied to the coil surrounding the permanent magnet. Let this current be given by the first-order response, $$\alpha(t)=1-e^{-t/\tau} \quad (6)$$

where t=0 corresponds to the time the switching command is initiated and i is an appropriate time constant. The magnetic field produced by the coil induces a change in the magnetic field properties of the permanent magnetic through remanence. To model this process, consider the function φ(t) given by, $$\phi(t)=2/\pi \tan^{-1}(\beta\alpha(t)-\gamma) \quad (7)$$

which approximately models the magnetic field of the permanent magnet as the current in the coil changes with time (where β and γ are tuning parameters). Given this approximation of the magnetic field, the forces exerted on the armature by the permanent magnet and coil are given respectively by, $$F_p = \frac{c_p u_0}{(r+R)^2}\emptyset(t) \quad (8)$$

$$F_c = \frac{c_c u_0}{(r+R)^2}\alpha(t)$$

where $c_p$ and $c_c$ are constants describing the strength of the magnet and $\mu_0$ is the magnetic permeability of air. The equation of motion for the armature is thus, $$\ddot{\theta}=I^{-1}(Fp\ l \cos F_c \cos \theta + k\theta) \quad (9)$$

where I is the moment of inertia of the armature about the hinge point. Physical measurements of the device can be used to provide values for r; R; l; L; k; and I. Five other parameters must be identified to simulate the time response of the latch relay mechanism, namely $c_p$; $c_c$; β; γ, and τ. These parameters may be estimated based on material composition of the magnets.

Armature displacement and angular velocity time histories for an example opening and closing sequence were recorded, where displacement is measured at the contacts. Experimental data showed that the average opening time is longer than the average closing time which is reflected in simulation model outputs. Note that the simulation predicts that the opening and closing operations will take approximately 28 ms and 24 ms respectively under nominal conditions To generate a physical device fingerprint, a Monte Carlo simulation was performed randomly perturbing the nominal values of the i parameter using a Gaussian distribution. This data was compared with experimental results obtained using the setup described above. A histogram of the response times for approximately 1200 runs shows that the similarity in these distributions demonstrates that the mechanical response characteristics can be adequately captured with this parameterized dynamic model.

To test how well a white box modeled "synthetic signature" could be used in fingerprinting, the same machine learning techniques were applied as before. One example of white box modeling is discussed in "Who's in Control of Your Control System? Device Fingerprinting for Cyber-Physical Systems" by David Formby, Preethi Srinivasan, Andrew Leonard, Jonathan Rogers, and Raheem Beyah. (The Network and Distributed System Security (NDSS) Symposium, February 2016). However, it was trained from the simulated distribution for one device and experimental measurements from the other device. The FF-ANN was trained using the same number of samples for each device, and then performance was tested using an equal number experimental measurements for each device. With classification accuracy leveling off around 80%, the white box model expectedly does not perform quite as well as the black box method based on true measurements due to the various simplifications and estimations made during the modeling process. However, the results are still promising for this new class of fingerprinting. Furthermore, in a real-world scenario the white box model approach would be limited to scenarios where there is not enough experimental data or the integrity of the experimental data is in question. The white box approach can then be combined with the black box approach to enable gray box modeling where appropriate to achieve higher accuracy. While there are a variety of techniques to approach this problem, intuitively it is similar to simply replacing synthetic samples in the white box distribution with real samples over time as they become available.

In order for a device fingerprinting method to be useful for any situation, whether it is for intrusion detection, surveillance, or network management, the techniques should be relatively accurate and scalable.

Each method of device fingerprinting described herein achieved high enough accuracy for a defense-in-breadth strategy as a supplement to traditional IDS approaches. The CLRT fingerprinting method achieved impressive classification accuracies as high as 99% in some cases and the physical device fingerprinting method was able to accurately classify measurements from two nearly identical devices around 92% of the time.

The FF-ANN algorithm used in training the two fingerprinting techniques only had one hidden layer and 200 input features, resulting in reasonable scalability for computational complexity. The alternate Bayes classifier algorithm can also be efficient. Furthermore, the results suggest that the accuracy for the methods scales as well. The CLRT fingerprinting method was already tested above on a full scale power substation network and was able to achieve high accuracies. Although the physical device fingerprinting method only achieved an accuracy of 92% for two similarly rated devices, an even higher accuracy can be expected as more diverse types of devices are added to the test set, resulting in more clear differences in distributions.

When using device fingerprinting to augment traditional IDS methods, it is also desired that the fingerprints be nontrivial to forge (i.e., resistant to mimicry attacks). Fortunately, there are several reasons as to why the proposed methods of device fingerprinting are not so easily broken. First, there is going to be inherent randomness in the attacker's machine that makes it non-trivial to perfectly reproduce anything based on precision timing. Second, for the physical device fingerprinting method, the adversary machine's clock must stay synchronized with the target device's clock to millisecond precision. While this may not be very difficult with modern computers and networks, most devices in legacy control system networks have much lower powered processors and experience significant clock drift. For example in the observed dataset, the RTU (SCADA master for the field devices) drifted away from our network sniffer's clock at a rate of 6 ms per hour.

To evaluate the proposed methods against forgery, two different classes of adversary are considered. First, the case where an adversary is unable to gain physical access to the target network, but instead is able to compromise one of the low powered devices on an air-gapped network is considered. Her goal is to watch the network long enough to generate black box fingerprints and spoof the responses of another device while matching their fingerprint. To model this adversary, a BeagleBone Black with 512 MB of RAM is used, and its ARM processor clocked down to 300 MHz to simulate the resources available on a high-end PLC. Second, a stronger adversary that has gained physical access to the network and is able to use her own, more powerful, machine to spoof the responses is considered. This stronger adversary was modeled by a standard desktop with a 3.4 GHz quad-core i7 processor and 16 GB of RAM. In both scenarios, the adversary is assumed to have gathered accurate samples and therefore has perfect knowledge of the signature she must try to mimic. However, in reality there are several difficulties that would make this perfect knowledge unlikely.

First, since the ICS environment contains an abundance of legacy devices, it is not certain that the compromised device would even have a network card that supports promiscuous mode for network sniffing. Additionally, any sniffing code installed on a low powered, compromised device would most likely be computationally expensive enough to skew timing measurements on the system. Furthermore, since it was found that network architecture does have some effect on the fingerprint, this suggests that the adversary would have to sniff the network in the same location as the fingerprinter to get a completely accurate distribution, or be able to determine the effects of the network by other means.

Cross-Layer Response Time Forgery: To test the CLRT fingerprinting method, an open source implementation of DNP3 (OpenDNP3 version 2.0.1) was modified to have microsecond precision sleep statements using the known CLRT distribution of one of the Vendor A Type 1b devices. The forgery attempt by the weaker adversary shows very clear differences in the distributions due to the limited resources slowing the distribution down and adding its own randomness. Compared with the original, the distribution of the stronger adversary's forgery attempt is very similar, but the forged one is slightly slower due to the adversary's own processing time.

When the Bayes classifier was applied to distinguish between the real device's distribution and the attacker's forged distribution, the results suggest high accuracy detection of the forgery can be achieved.

Physical Fingerprinting Operation Time Forgery: To study the forgery of the physical fingerprinting technique, a DNP3 master was configured to send operate commands every second, and the adversary machine's modified OpenDNP3 code was programmed to send responses with timestamps calculated from the machine's current time, added with the known distribution of operation times. The resulting forgery attempt by the weaker adversary shows distributions that appear completely different due to the BeagleBone's clock quickly drifting from the SCADA master's, thus making the forgery attempt easily detected. The forgery attempt by the stronger adversary is similar to the original, but still has noticeable differences most likely due to the high-end PC timestamping the operations faster than the original device. The results from the Bayes classifier in this scenario also suggest that high accuracy detection of forgery is possible.

Even though both fingerprinting techniques exhibit resistance to these naïve forgery attacks, it is still possible that an attacker could more intelligently shape her response times to more closely match the true fingerprint and implement a method of keeping better clock synchronization with the target. However, this would require a significantly more knowledgeable and skilled adversary to successfully accomplish. She would have to know beforehand the relative speed of her machine to the target's machine, have knowledge of any effects the network architecture might have on the signature, and determine how fast the target's clock drifts, all suggesting that these methods are robust enough to be used as part of a defense-in-breadth IDS strategy.

Although the device fingerprinting techniques proposed here are passive and do not need changes to the target network or devices, better defenses against mimicry attacks could be implemented if this assumption is removed. For example, the SCADA master or the fingerprinter could be configured to randomly send extra requests or commands that have no effect on the operation of the network, but would increase the knowledge requirement of the adversary and the complexity of the behavior she has to mimic. For the CLRT method, this could involve changing from polling for event data to polling for different numbers of specific measurements each time, which on the low powered embedded systems should theoretically result in measurable timing differences. For the physical fingerprinting method this could take the form of sending redundant commands, for example by sending a close command when the breaker is already closed.

Figure 13:
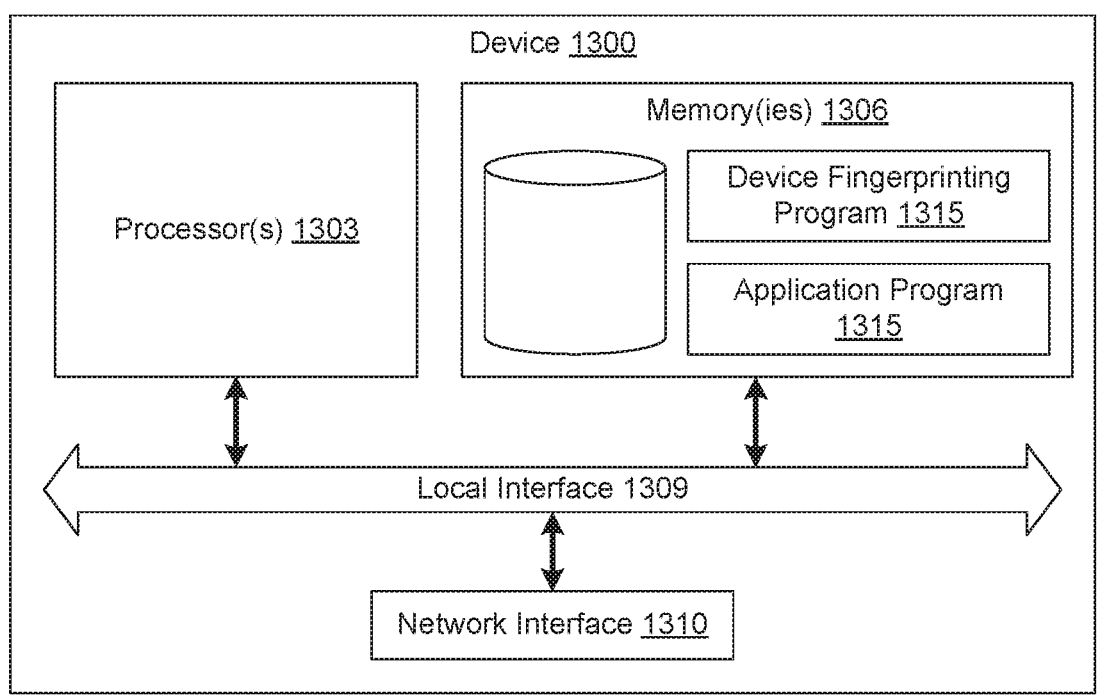
FIG. 13 is a schematic block diagram that provides one example illustration of a computing environment employed in the control system environment of FIG. 1, according to various embodiments of the present disclosure

With reference to FIG. 13, shown is a schematic block diagram of an example of the control system environment 100 according to an embodiment of the present disclosure. The control system environment 100 includes one or more devices 1300. In some embodiments, among others, the device 1300 may represent a computing device or system (e.g. computers, servers, SCADA master, etc.). Each device 1300 includes at least one processor circuit, for example, having a processor 1303 and a memory 1306, both of which are coupled to a local interface 1309. To this end, each device 1300 may comprise, for example, at least one server computer or like device. The local interface 1309 may comprise, for example, a data bus with an accompanying address/control bus or other bus structure as can be appreciated.

In some embodiments, the device 1300 can include one or more network interfaces 1310. The network interface 1310 may comprise, for example, a wireless transmitter, a wireless transceiver, and a wireless receiver. The network interface 1310 can communicate to a remote computing device using any of a variety of communication protocols as previously discussed. As one skilled in the art can appreciate, other communication protocols may be used in the various embodiments of the present disclosure.

Stored in the memory 1306 are both data and several components that are executable by the processor 1303. In particular, stored in the memory 1306 and executable by the processor 1303 are device fingerprinting program 1315, application program 1318, and potentially other applications. Also stored in the memory 1306 may be a data store 1312 and other data. In addition, an operating system may be stored in the memory 1306 and executable by the processor 1303.

It is understood that there may be other applications that are stored in the memory 1306 and are executable by the processor 1303 as can be appreciated. Where any component discussed herein is implemented in the form of software, any one of a number of programming languages may be employed such as, for example, C, C++, C#, Objective C, Java®, JavaScript®, Perl, PHP, Visual Basic®, Python®, Ruby, Flash®, or other programming languages.

A number of software components are stored in the memory 1306 and are executable by the processor 1303. In this respect, the term "executable" means a program file that is in a form that can ultimately be run by the processor 1303. Examples of executable programs may be, for example, a compiled program that can be translated into machine code in a format that can be loaded into a random access portion of the memory 1306 and run by the processor 1303, source code that may be expressed in proper format such as object code that is capable of being loaded into a random access portion of the memory 1306 and executed by the processor 1303, or source code that may be interpreted by another executable program to generate instructions in a random access portion of the memory 1306 to be executed by the processor 1303, etc. An executable program may be stored in any portion or component of the memory 1306 including, for example, random access memory (RAM), read-only memory (ROM), hard drive, solid-state drive, USB flash drive, memory card, optical disc such as compact disc (CD) or digital versatile disc (DVD), floppy disk, magnetic tape, or other memory components.

The memory 1306 is defined herein as including both volatile and nonvolatile memory and data storage components. Volatile components are those that do not retain data values upon loss of power. Nonvolatile components are those that retain data upon a loss of power. Thus, the memory 1306 may comprise, for example, random access memory (RAM), read-only memory (ROM), hard disk drives, solid-state drives, USB flash drives, memory cards accessed via a memory card reader, floppy disks accessed via an associated floppy disk drive, optical discs accessed via an optical disc drive, magnetic tapes accessed via an appropriate tape drive, and/or other memory components, or a combination of any two or more of these memory components. In addition, the RAM may comprise, for example, static random access memory (SRAM), dynamic random access memory (DRAM), or magnetic random access memory (MRAM) and other such devices. The ROM may comprise, for example, a programmable read-only memory (PROM), an erasable programmable read-only memory (EPROM), an electrically erasable programmable read-only memory (EEPROM), or other like memory device.

Also, the processor 1303 may represent multiple processors 1303 and/or multiple processor cores and the memory 1306 may represent multiple memories 1306 that operate in parallel processing circuits, respectively. In such a case, the local interface 1309 may be an appropriate network that facilitates communication between any two of the multiple processors 1303, between any processor 1303 and any of the memories 1306, or between any two of the memories 1306, etc. The local interface 1309 may comprise additional systems designed to coordinate this communication, including, for example, performing load balancing. The processor 1303 may be of electrical or of some other available construction.

Although the device fingerprinting program 1315 and the application program 1318, and other various systems described herein may be embodied in software or code executed by general purpose hardware as discussed above, as an alternative the same may also be embodied in dedicated hardware or a combination of software/general purpose hardware and dedicated hardware. If embodied in dedicated hardware, each can be implemented as a circuit or state machine that employs any one of or a combination of a number of technologies. These technologies may include, but are not limited to, discrete logic circuits having logic gates for implementing various logic functions upon an application of one or more data signals, application specific integrated circuits (ASICs) having appropriate logic gates, field-programmable gate arrays (FPGAs), or other components, etc. Such technologies are generally well known by those skilled in the art and, consequently, are not described in detail herein.

The flow charts of FIGS. 8 and 12 illustrate example of functionality and operation of an implementation of portions of various embodiments of the present disclosure. If embodied in software, each block may represent a module, segment, or portion of code that comprises program instructions to implement the specified logical function(s). The program instructions may be embodied in the form of source code that comprises human-readable statements written in a programming language or machine code that comprises numerical instructions recognizable by a suitable execution system such as a processor 1303 in a computer system or other system. The machine code may be converted from the source code, etc. If embodied in hardware, each block may represent a circuit or a number of interconnected circuits to implement the specified logical function(s).

Although the flow charts of FIGS. 8 and 12 show a specific order of execution, it is understood that the order of execution may differ from that which is depicted. For example, the order of execution of two or more blocks may be scrambled relative to the order shown. Also, two or more blocks shown in succession in FIGS. 8 and 12 may be executed concurrently or with partial concurrence. Further, in some embodiments, one or more of the blocks shown in FIGS. 8 and 12 may be skipped or omitted. In addition, any number of counters, state variables, warning semaphores, or messages might be added to the logical flow described herein, for purposes of enhanced utility, accounting, performance measurement, or providing troubleshooting aids, etc. It is understood that all such variations are within the scope of the present disclosure.

Also, any logic or application described herein, including the device fingerprinting program 1315 and the application program 1318, that comprises software or code can be embodied in any non-transitory computer-readable medium for use by or in connection with an instruction execution system such as, for example, a processor 1303 in a computer system or other system. In this sense, the logic may comprise, for example, statements including instructions and declarations that can be fetched from the computer-readable medium and executed by the instruction execution system. In the context of the present disclosure, a "computer-readable medium" can be any medium that can contain, store, or maintain the logic or application described herein for use by or in connection with the instruction execution system.

The computer-readable medium can comprise any one of many physical media such as, for example, magnetic, optical, or semiconductor media. More specific examples of a suitable computer-readable medium would include, but are not limited to, magnetic tapes, magnetic floppy diskettes, magnetic hard drives, memory cards, solid-state drives, USB flash drives, or optical discs. Also, the computer-readable medium may be a random access memory (RAM) including, for example, static random access memory (SRAM) and dynamic random access memory (DRAM), or magnetic random access memory (MRAM). In addition, the computer-readable medium may be a read-only memory (ROM), a programmable read-only memory (PROM), an erasable programmable read-only memory (EPROM), an electrically erasable programmable read-only memory (EEPROM), or other type of memory device.

Further, any logic or application described herein, including the device fingerprinting program 1315 and the application program 1318, may be implemented and structured in a variety of ways. For example, one or more applications described may be implemented as modules or components of a single application. Further, one or more applications described herein may be executed in shared or separate computing devices or a combination thereof. For example, a plurality of the applications described herein may execute in the same device 1300, or in multiple computing devices in the same control system environment 100. Additionally, it is understood that terms such as "application," "service," "system," "engine," "module," and so on may be interchangeable and are not intended to be limiting.

It should be noted that ratios, concentrations, amounts, and other numerical data may be expressed herein in a range format. It is to be understood that such a range format is used for convenience and brevity, and thus, should be interpreted in a flexible manner to include not only the numerical values explicitly recited as the limits of the range, but also to include all the individual numerical values or sub-ranges encompassed within that range as if each numerical value and sub-range is explicitly recited. To illustrate, a concentration range of "about 0.1% to about 5%" should be interpreted to include not only the explicitly recited concentration of about 0.1 wt % to about 5 wt %, but also include individual concentrations (e.g., 1%, 2%, 3%, and 4%) and the sub-ranges (e.g., 0.5%, 1.1%, 2.2%, 3.3%, and 4.4%) within the indicated range. In an embodiment, the term "about" can include traditional rounding according to significant figures of the numerical value. In addition, the phrase "about 'x' to 'y'" includes "about 'x' to about 'y'".

While only a few embodiments of the present disclosure have been shown and described herein, it will become apparent to those skilled in the art that various modifications and changes can be made in the present disclosure without departing from the spirit and scope of the present disclosure. All such modification and changes coming within the scope of the appended claims are intended to be carried out thereby.

We claim at least the following:

1. A method, comprising:
  identifying at least one equation that describes a physical motion of a latch mechanism of a physical actuator and a magnetic field of a coil of the physical actuator, the at least one equation comprising model parameters that include physical dimension based parameters and material composition based parameters of the physical actuator;
  generating a probability density function of response times for the physical actuator based at least in part on the at least one equation that describes the physical motion of the latch mechanism and the magnetic field of the coil, wherein a simulation that generates the probability density function varies at least one of the model parameters in the at least one equation using an uncertainty distribution;
  measuring at least one cross-layer response time of a field device deployed in a control system; and
  classifying the field device as a classification associated with the physical actuator, wherein the field device is classified based on a comparison of the at least one cross-layer response time of the field device with the probability density function of response times for the physical actuator.

2. The method of claim 1, wherein the at least one equation comprises a time constant ($\tau$) associated with the physical motion.

3. The method of claim 1, wherein the simulation to generate the probability density function varies a time constant ($\tau$) using a Gaussian distribution.

4. The method of claim 3, wherein the simulation comprises a Monte Carlo simulation.

5. The method of claim 1, further comprising:
  transmitting at least one read request to the field device.

6. The method of claim 5, further comprising:
  identifying at least one response to the at least one read request.

7. The method of claim 6, further comprising:
  determining that the at least one response comprises a forgery attempt based on a comparison of a timestamp of the at least one response with the probability density function of response times for the physical actuator.

8. A system, comprising:
  a computing device
  a memory comprising instructions that are executed, causing the computing device to at least:
    identify at least one equation that describes a physical motion of a latch mechanism of a physical actuator and a magnetic field of a coil of the physical actuator, the at least one equation comprising model parameters that include physical dimension based parameters and material composition based parameters of the physical actuator;
  generate a probability density function of response times for the physical actuator based at least in part on the at least one equation that describes the physical motion of the latch mechanism and the magnetic field of the coil, wherein a simulation that generates the probability density function varies at least one of the model parameters in the at least one equation using an uncertainty distribution;
  measure at least one cross-layer response time of a field device deployed in a control system; and
  classify the field device as a classification associated with the physical actuator, wherein the field device is classified based on a comparison of the at least one cross-layer response time of the field device with the probability density function of response times for the physical actuator.

9. The system of claim 8, wherein the at least one equation comprises a time constant ($\tau$) associated with the physical motion.

10. The system of claim 8, wherein the simulation to generate the probability density function varies a time constant ($\tau$) using a Gaussian distribution.

11. The system of claim 8, wherein the simulation comprises a Monte Carlo simulation.

12. The system of claim 8, wherein the instructions further cause the computing device to at least:
  transmit at least one read request to the field device.

13. The system of claim 12, wherein the instructions further cause the computing device to at least:

identify at least one response to the at least one read request.

14. The system of claim 13, further comprising:
determining that the at least one response comprises a forgery attempt based on a comparison of a timestamp of the at least one response with the probability density function of response times for the physical actuator.

15. A non-transitory computer-readable medium comprising instructions executable in a computing device, wherein the instructions cause the computing device to at least:
identify at least one equation that describes a physical motion of a latch mechanism of a physical actuator and a magnetic field of a coil of the physical actuator, the at least one equation comprising model parameters that include physical dimension based parameters and material composition based parameters of the physical actuator;
generate a probability density function of response times for the physical actuator based at least in part on the at least one equation that describes the physical motion of the latch mechanism and the magnetic field of the coil, wherein a simulation that generates the probability density function varies at least one of the model parameters in the at least one equation using an uncertainty distribution;
measure at least one cross-layer response time of a field device deployed in a control system; and
classify the field device as a classification associated with the physical actuator, wherein the field device is classified based on a comparison of the at least one cross-layer response time of the field device with the probability density function of response times for the physical actuator.

16. The non-transitory computer-readable medium of claim 15, wherein the at least one equation comprises a time constant ($\tau$) associated with the physical motion.

17. The non-transitory computer-readable medium of claim 15, wherein the simulation to generate the probability density function varies a time constant ($\tau$) using a Gaussian distribution.

18. The non-transitory computer-readable medium of claim 15, wherein the simulation comprises a Monte Carlo simulation.

19. The non-transitory computer-readable medium of claim 15, wherein the instructions further cause the computing device to at least:
transmit at least one read request to the field device; and
identify at least one response to the at least one read request.

20. The non-transitory computer-readable medium of claim 19, wherein the instructions further cause the computing device to at least:
determine that the at least one response comprises a forgery attempt based on a comparison of a timestamp of the at least one response with the probability density function of response times for the physical actuator.

* * * * *